US011559793B2

(12) United States Patent
Zheng et al.

(10) Patent No.: US 11,559,793 B2
(45) Date of Patent: Jan. 24, 2023

(54) PEROVSKITE CATALYSTS AND USES THEREOF

(71) Applicant: Research Triangle Institute, Research Triangle Park, NC (US)

(72) Inventors: Qinghe Zheng, Durham, NC (US); Marty Lail, Raleigh, NC (US); Kelly E. Amato, Cary, NC (US)

(73) Assignee: Research Triangle Institute, Research Triangle Park (NC)

( * ) Notice: Subject to any disclaimer, the term of this patent is extended or adjusted under 35 U.S.C. 154(b) by 0 days.

(21) Appl. No.: 17/510,847

(22) Filed: Oct. 26, 2021

(65) Prior Publication Data

US 2022/0111366 A1    Apr. 14, 2022

Related U.S. Application Data

(62) Division of application No. 16/349,936, filed as application No. PCT/US2017/061436 on Nov. 14, 2017, now Pat. No. 11,179,704.

(60) Provisional application No. 62/421,568, filed on Nov. 14, 2016.

(51) Int. Cl.
| | |
|---|---|
| *B01J 23/00* | (2006.01) |
| *B01J 23/78* | (2006.01) |
| *B01J 23/89* | (2006.01) |
| *B01J 35/04* | (2006.01) |
| *B01J 37/03* | (2006.01) |
| *B01J 37/08* | (2006.01) |
| *F01N 3/10* | (2006.01) |
| *F01N 3/28* | (2006.01) |

(52) U.S. Cl.
CPC ......... *B01J 23/8946* (2013.01); *B01J 23/002* (2013.01); *B01J 23/78* (2013.01); *B01J 35/04* (2013.01); *B01J 37/036* (2013.01); *B01J 37/088* (2013.01); *F01N 3/101* (2013.01); *F01N 3/2828* (2013.01)

(58) Field of Classification Search
CPC ...... B01J 23/8946; B01J 23/002; B01J 23/78; B01J 35/04; B01J 37/088; B01J 23/34; B01J 2523/00; B01J 23/83; B01J 2523/23; B01J 2523/48; B01J 2523/24; B01J 2523/3706; B01J 2523/842; B01J 37/036; F01N 3/101; F01N 3/282; F01N 2330/06; B01D 2255/2092; B01D 2255/20715; B01D 2255/1025; B01D 2258/012; B01D 2255/402; B01D 2255/1023; B01D 53/945; B01D 2255/30; B01D 2255/50; B01D 2255/2065; B01D 2255/20707; Y02T 10/12; Y02E 60/36; Y02A 50/20; Y02P 20/145; C01B 3/04

See application file for complete search history.

(56) References Cited

U.S. PATENT DOCUMENTS

| | | |
|---|---|---|
| 3,865,752 A | 2/1975 | Remeika et al. |
| 3,865,923 A | 2/1975 | Stephens |
| 3,884,837 A | 5/1975 | Remeika et al. |
| 3,885,977 A | 5/1975 | Lachman et al. |
| 3,897,367 A | 7/1975 | Lauder |
| 3,929,670 A | 12/1975 | Kudo et al. |
| 4,001,371 A | 1/1977 | Remeika et al. |
| 4,024,706 A | 5/1977 | Adawi et al. |
| 4,049,583 A | 9/1977 | Lauder |
| 4,107,163 A | 8/1978 | Donohue |
| 4,126,580 A | 11/1978 | Lauder |
| 4,151,123 A | 4/1979 | McCann, III |
| 4,250,146 A | 2/1981 | Bailey |
| 4,321,250 A | 3/1982 | Hart |
| 4,748,143 A | 5/1988 | Tabata et al. |
| 4,849,398 A | 7/1989 | Takada et al. |
| 5,318,937 A | 6/1994 | Jovanovic et al. |
| 5,380,692 A | 1/1995 | Nakatsuji et al. |
| 5,562,888 A * | 10/1996 | Rajadurai .......... B01D 53/8628 423/239.1 |
| 5,977,017 A | 11/1999 | Golden |
| 6,680,036 B1 | 1/2004 | Fisher et al. |
| 7,718,562 B2 | 5/2010 | Gandhi et al. |
| 11,179,704 B2 | 11/2021 | Zheng et al. |
| 2003/0148881 A1 | 8/2003 | Matsuo et al. |
| 2004/0024071 A1 | 2/2004 | Meier |
| 2008/0078675 A1 | 4/2008 | Kawahara |
| 2010/0233045 A1 | 9/2010 | Kim et al. |
| 2011/0038783 A1 | 2/2011 | Satchell, Jr. |
| 2012/0047874 A1 | 3/2012 | Schmieg et al. |

(Continued)

FOREIGN PATENT DOCUMENTS

| | | |
|---|---|---|
| CN | 1461238 | 12/2003 |
| EP | 0468127 A2 | 1/1992 |

(Continued)

OTHER PUBLICATIONS

Notice of Allowance dated May 18, 2022 from associated U.S. Appl. No. 16/802,868 (10 pages).

Albrecht, K.J., et al. "Thermodynamically Consistent Modeling of Redox-Stable Perovskite Oxides for Thermochemical Energy Conversion and Storage". Appl Energy, vol. 165, pp. 285-296 (2016) (manuscript version 40 pgs).

(Continued)

*Primary Examiner* — Timothy C Vanoy

(74) *Attorney, Agent, or Firm* — Olive Law Group, PLLC; Nathan P. Letts

(57) ABSTRACT

The present disclosure provides perovskite catalytic materials and catalysts comprising platinum-group metals and perovskites. These catalysts may be used as oxygen storage materials with automotive applications, such as three-way catalysts. They are also useful for water or $CO_2$ reduction, or thermochemical energy storage.

14 Claims, 12 Drawing Sheets

(56) References Cited

U.S. PATENT DOCUMENTS

Figure 1A:
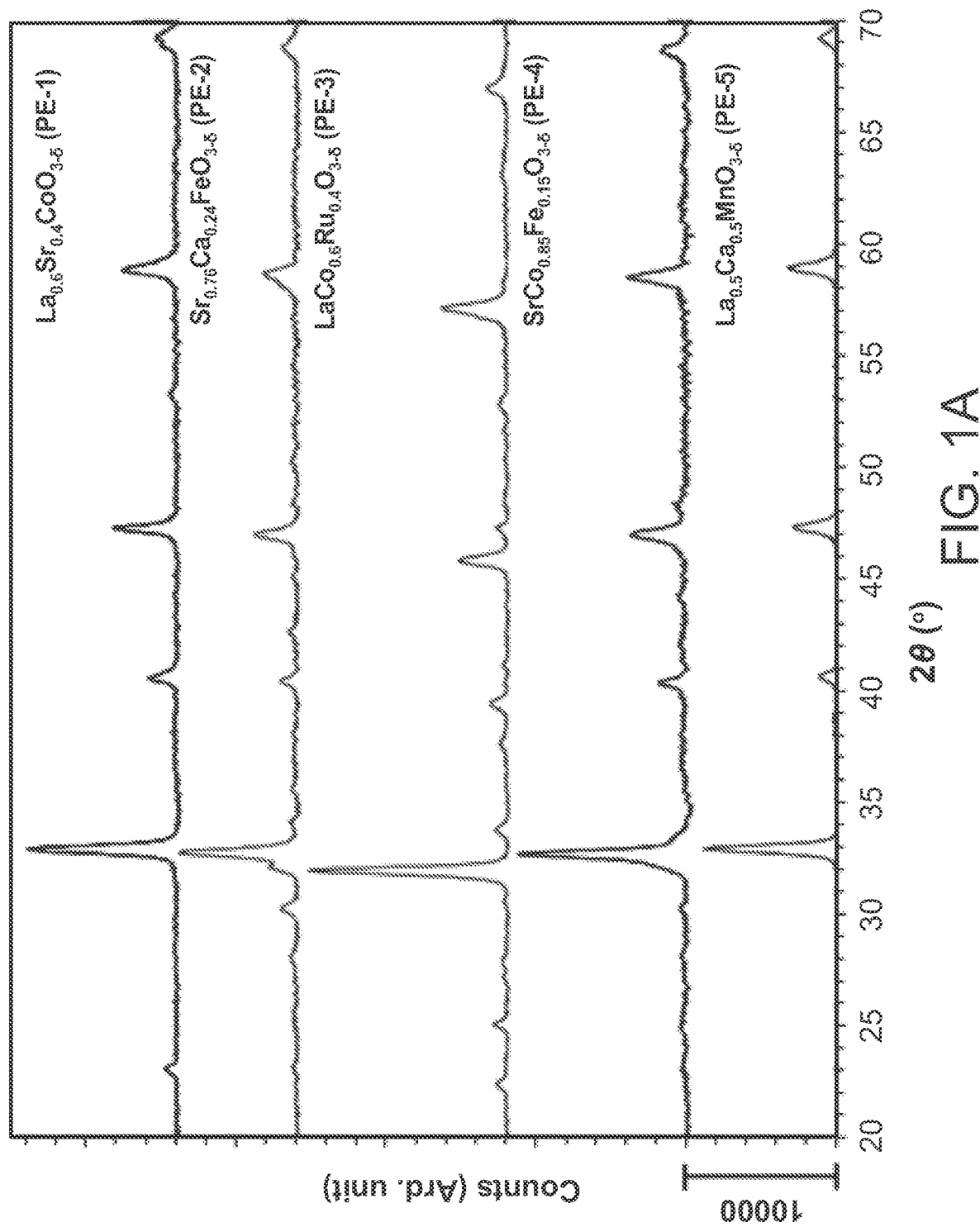

| | | | |
|---|---|---|---|
| 2014/0018235 A1 | 1/2014 | Ito et al. | |
| 2015/0060743 A1 | 3/2015 | Yashima | |
| 2015/0196902 A1 | 7/2015 | Golden et al. | |
| 2017/0232387 A1* | 8/2017 | Qi | B01J 35/023 502/303 |
| 2020/0406236 A1 | 12/2020 | Ishihara et al. | |

FOREIGN PATENT DOCUMENTS

| | | |
|---|---|---|
| JP | S6253737 A | 3/1987 |
| JP | H04118050 A | 4/1992 |
| JP | H04371229 A * | 12/1992 |
| JP | 2005254217 A | 9/2005 |

OTHER PUBLICATIONS

Babiniec, Sean M., et al. "Investigation of LaxSr1-xCoyM1-yO$_3$-δ (M—Mn, Fe) perovskite materials as thermochemical energy storage media". Sol. Energy, vol. 118, pp. 451-459 (2015)(manuscript version 29 pgs).

Bork, H., et al. "Perovskite La0.6SR0.4Cr1-xCoxO3-δ solid solutions for solar-thermochemical fuel production: strategies to lower the operation temperature". J. Mater. Chem. A, vol. 3, No. 30, pp. 15546-15557 (2015).

Demont, A., et al. "High redox activity of Sr-substituted lanthanum manganite perovskites for two-step thermochemical dissociation of CO2". RSC Adv., vol. 4, No. 97, pp. 54885-54891 (2014).

Dey, Sunita, et al. "Noteworthy performance of La1-xCAxMnO3 perovskites in generating H2 and CO by the thermochemical splitting of H2O and Co2". Phys. Chem. Chem. Phys., vol. 17, No. 1, pp. 122-125 (2014).

Escalona, N., et al. "Fischer-Tropsch synthesis over LaLe1-xCoxO3 perovskites from a simulated biosyngas feed". Appl. Catal. Gen., vol. 381, Nos. 1-2, pp. 253-260 (2010).

Galvez, M.E., et al. "Physico-chemical changes in Ca, Sr and Al-doped La—Mn—O perovskites upon thermochemical splitting of CO2 via redox cycling". Phys. Chem. Chem. Phys., vol. 17, No. 9, pp. 6629-6634 (2015).

Glisenti, A., et al. "Largely Cu-doped CaCo1-xCuxO3 peroskites for TWC: Toward new PGM-free catalysts." Appl. Catal. B Environ., vol. 180, pp. 94-150 (2016)(abstract only).

Guilhaume, Nolven, et al. "Three-Way Catalytic Activity and Oxygen Storage Capacity of Perovskite LaMn0.976Rh0.024O3-δ". J. Catal., vol. 165, No. 2, pp. 197-204 (1997).

Hancock, J.D., et al. "Method of Comparing Solid-State Kinetic Data and Its Application to the Decomposition of Kaolinite, Brucite, and BaCo3". J. Am. Ceram. Soc., vol. 55, No. 2, pp. 74-77 (1972).

Hernandez, W.Y., et al. "La/Sr-based perovskites as soot oxidation catalysts for Gasoline Particulate Filters". Catal. Today, vol. 258, Part 2, pp. 525-534 (2105)(article in press version, 10 pgs).

Hu, L., et al. "Fe,Pd Co-Incorporated LaCoO3 Perovskites: Modification of Thermal Stability and Catalytic Activity for Gasoline Vehicle Exhaust Purification." Eur. J. Inorg. Chem., vol. 2015, No. 13, pp. 2317-2322 (2015).

Ikeda, H., et al. "SrCoxFe1-xO3-δ Oxygen Sorbent Usable for High-Temperature Pressure-Swing Adsorption Process Operating at Approximately 300° C". Ind. Eng. Chem. Res., vol. 55, No. 22, pp. 6501-6505 (2016).

Keav, S., et al. "Structured Perovskite-Based Catalysts and Their Application as Three-Way Catalytic Converters—A Review". Catalysts, vol. 4, No. 3, pp. 226-255 (20140.

Klimkowicz, Alicja, et al. "Oxygen storage capability in Co- and Fe-containing perovskite-type oxides". Solid State Ion., vol. 257, pp. 23-28 (2014).

Levasseur, B., et al. "Effects of iron and cerium in La1-yCeyCo1-xFexO3 perovskites as catalysts for VOC oxidation". Appl. Catal. B. Environ., vol. 88, Nos. 3-4, pp. 305-314 (2009)(abstract only).

Li, Z., et al. "Highly efficient multifunctional dually-substituted perovskite catalysts La1-xKxCo1-yCuyO3-δ used for soot combustion, NOx storage and simultaneous NOx-soot removal". Appl. Catal. B Environment, vols. 121-122, pp. 65-74 (2012).

Li, X., et al. "Pd-Doped Perovskite: An Effective Catalyst for Removal of NOx from Lean-Burn Exhausts with High Sulfur Resistance." ACS Catal., vol. 3, No. 6, pp. 1071-1075 (2013).

Malamis, S.A., et al. "Comparison of precious metal doped and impregnated perovskite oxides for TWC application." Catal. Today, vol. 258, Part 2, pp. 535-542 (2015)(abstract only).

Mamontov, E., et al. "Lattics Defects and Oxygen Storage Capacity of Nanocrystalline Ceria and Ceria-Zirconia". J. Phys. Chem. B, vol. 104, No. 47, pp. 11110-11116 (2000).

McDaniel, A.H., et al. "Nonstoichiometric perovskite oxides for solar thermochemical H2 and CO production". Energy Procedia, vol. 49, pp. 2009-2018 (2014).

Miura, N., et al. "Sr1-xCaxFeo3-δ as a New Oxygen Sorbent for the High-Temperature Pressure-Swing Adsorption Process". Ind. Eng. Chem. Res., vol. 55, No. 11, pp. 3091-3096 (2016).

Mizusaki, Junichiro, et al. "Nonstoichiometry and thermochemical stability of the perovskite-type La1-xSrxMnO3-δ". Solid State Ion., vol. 49, pp. 111-118 (1991).

Mooney, John J. "Emission Control, Automotive". Kirk-Othmer Encyclopedia of Chemical Technology, vol. 10, pp. 30-67 (2005).

Mota, N., et al. "Ruthenium Effect of Formation Mechanism and Structural Characteristics of LaCo1-xRuxO3 Perovskites and Its Influence on Catalytic Performance for Hydrocarbon Oxidative Reforming". J. Phys. Chem. C, vol. 119, No. 29, pp. 16708-16723 (2015).

Motohashi, T., et al. "Oxygen Intake/Release Mechanism of Double-Perovskite Type BaYMn2O5+δ (0≤δ≤1)". J. Phys. Chem. C, vol. 117, No. 24, pp. 12560-12566 (2013).

Nishihata, Y., et al. "Self-regeneration of a Pd-perovskite catalyst for automotive emissions control". Nature, vol. 418, No. 6894, pp. 164-167 (2002).

Pecchi, G., et al. "Effect of the preparation method on the catalytic activity of La1-xCaxFeO3 perovskite-type oxides". Catal. Today, vols. 133-135, pp. 420-427 (2008)(abstract only).

Ran, R., et al. "Oxygen storage capacity and structural properties of Ni-doped LaMnO3 perovskites". J. Alloys Compd., vol. 577, pp. 288-294 (2013).

Royer, S. et al. "Oxygen storage capacity of La1-xA'xBO3 perovskites (with A'-Sr, Ce; B = Co, Mn)-relation with catalytic activity in the CH4 oxidation reaction". Appl. Catal. B Environ., vol. 58, Nos. 3-4, pp. 273-288 (2005).

Sartipi, S., et al. "PD-doped LaCoO3 regenerative catalyst for automotive emissions control". Appl. Catal. B Environ., vol. 83, Nos. 3-4 (2008).

Seymour, R.J. "Platinum-Group Metals" Kirk-Othmer Encyclopedia of Chemical Technology, 5th Ed., pp. 1-37 (2012).

Shen, Shiaw-Tzong, et al. "Comparative Study of Catalytic Reduction of Nitric Oxide with Carbon Monoxide over the La1-xSrxBO3 (B=Mn, Fe, Co, Ni) Catalysts". Ind. Eng. Chem. Res., vol. 37, No. 7, pp. 2654-2661 (1998).

Shen, Wen-Jie, et al. "The influence of the support on the activity and selectivity of Pd in CO hydrogeneration". Appl. Catal. Gen., vol. 213, No. 2, pp. 225-232 (2001).

Simson, A., et al. "A feasibility study of niobium-containing materials for oxygen storage in three way catalytic converters". Appl. Catal. B Environ., vols. 158-159, pp. 106-111 (2014).

Song, Hua, et al. "Changing the Oxygen Mobility in Co/Ceria Catalysts by Ca Incorporation: Implications for Ethanol Steam Reforming". J. Phys. Chem. A, vol. 114, No. 11, pp. 3796-3801 (2010).

Tanaka, Hirohisa, et al. "Advances in designing perovskite catalysts". Curr. Opin. Solid State Mater. Sci., vol. 5, No. 5, pp. 381-387 (2001).

Tanaka, H., et al. "Regeneration of palladium subsequent to solid solution and segregation in a perovskite catalyst: an intelligent catalyst". Top. Catal., vols. 16-17, Nos. 1-4, pp. 63-70 (2001).

Tanaka, H., et al. "Catalytic activity and structural stabiity of La0.9Ce0.1Co1-xFexO3 perovskite catalysts for automotive emissions control". Appl. Catal. Gen., vol. 244, No. 2, pp. 371-382 (2003).

(56) References Cited

OTHER PUBLICATIONS

Tanaka, H., et al. "Self-Regenerating Rh- and Pt-Based Perovskite Catalysts for Automotive-Emissions Control". Angew. Chem. Int. Ed., vol. 45, No. 36, pp. 5998-6002 (2006).

Uenishi, Mari, et al. "The reducing capability of palladium segregated from perovskite-type LaFePdOx automotive catalysts". Appl. Catal. Gen., vol. 296, No. 1, pp. 114-119 (2005).

Yoon, D.Y., et al. "Thermal stability of Pd-containing LaAlO3 perovskite as a modern TWC". J. Catal., vol. 330, pp. 71-83 (2015)(abstract and section snippets, 6 pgs).

You, Rui, et al. "YCeZrO Ternary Oxide Solid Solution Supported Nonplatinic Lean-Burn NOx Trap Catalysts Using LcCoO3 Perovskite as Active Phase". J. Phys. Chem. C, vol. 118, No. 44, pp. 25403-25420 (2014).

Zheng, Qinghe, et al. "Part I: A Comparative Thermal Aging Study on the Regenerability of Rh/Al2O3 and Rh/CexOy-ZrO2 as Model Catalysts for Automotive Three Way Catalysts". Catalysts, vol. 5, No. 4, pp. 1770-1796 (2015).

Zheng, Qinghe, et al. "Part II: Oxidative Thermal Aging of Pd/Al2O3 and Pd/CexOy-ZrO2 in Automotive Three Way Catalysts: The Effects of Fuel Shutoff and Attempted Fuel Rich Regeneration". Catalysts, vol. 5, No. 4, pp. 1797-1814 (2015).

Zheng, Qinghe, et al. "Pd doped CaCoxZr1-xO3-δ perovskites for automotive emissions control". Catalysis Today, vol. 320, pp. 30-39 (2019).

International Search Report and Written Opinion issued in counterpart PCT Application No. PCT/US2017/061436 dated Sep. 18, 2018 (15 pages).

Klimkowicz, Alicja et al. 2014. "Oxygen storage capability in Co-Fe- containing perovskite-type oxides." Solid State Ionics. vol. 257, 23-28.

Mooney, John J. 2004. "Emission Control, Automotive." Kirk-Othmer Encyclopedia of Chemical Technology. vol. 10, 30-67.

Ran, Rui et al. 2013. "Oxygen storage capacity and structural properties of Ni-doped LaMnO3 perovskites." Journal of Alloys and Compounds. vol. 577, 288-294.

Royer, S. et al. 2005. "Oxygen storage capacity of La1-xAxBO3 perovskites (with A' = Sr, Ce; B = Co, Mn)—relation with catalytic activity in the CH4 oxidation reaction." Applied Catalysis B: Environmental. vol. 58, 273-288.

Royer, Sebastien et al. 2014. "Perovskites as Substitutes of Noble Metals for Heterogeneous Catalysis: Dream or Reality." Chem. Rev. vol. 114, 10292-10368.

Sartipi, Sina et al. 2008. "Pd-doped LaCoO3 regenerative catalyst for automotive emissions control." Applied Catalysis B: Environmental. vol. 83, 214-220.

Seymour, Richard J. and Julia O'Farrelly. 2012. "Platinum-Group Metals." Kirk-Othmer Encyclopedia of Chemical Technology. p. 1-37.

Tanaka, Hirohisa et al. 2006. "Self-Regenerating Rh- and PT-Based Perovskite Catalysts for Automotive-Emissions Control." Angew. Chem. Int. Ed. vol. 45, 5998-6002.

Zheng, Qinghe et al. 2015. "Part I: A Comparative Thermal Aging Study on the Regenerability of Rh/Al2O3 and Rh/CexOy-ZrO2 as Model Catalysts for Automotive Three Way Catalysts." Catalysts. vol. 5, 1770-1796 (published Oct. 23, 2015).

Zheng, Qinghe et al. 2017. "Pd doped CaCoxZr1-xO3-o perovskites for automotive emissions control." Catalysis Today. vol. 320, 30-39 (published online Nov. 11, 2017).

Zheng, Qinghe. 2015. "Part II: Oxidative Thermal Aging of Pd/Al2O3 and Pd/CexOy-ZrO2 in Automotive Three Way Catalysts: The Effects of Fuel Shutoff and Attempted Fuel Rich Regeneration." Catalysts. vol. 5, 1797-1814 (published Oct. 23, 2015).

Notification of Reasons for Refusal for Japanese Application No. 2019-56110 dated Sep. 21, 2021.

International Preliminary Report on Patentability issued in counterpart PCT Application No. PCT/US2017/061436 dated May 14, 2019.

Notice of Allowance for associated Mexican Application No. MX/2021/071146 dated Oct. 12, 2021 (2 pages).

Office Action for associated Korean Application No. 9-5-2021-093555747 dated Nov. 29, 2021 (10 pages).

Office Action for associated U.S. Appl. No. 16/802,868 dated Feb. 4, 2022 (21 pages).

Office Action dated Oct. 20, 2022 for associated Korean Patent Application No. 2022-7028082 (21 pages).

Notice of Publication dated Nov. 9, 2022 for associated European Patent Application No. 22187610.5 (2 pages).

Malamis et al., 2015, "Comparison of precious metal doped and impregnated perovskiteoxides for TWC application" Catalysis Today 258 535-542 (8 pages).

Royer et al., 2014, "Perovskites as Substitutes of Noble Metals for Heterogeneous Catalysis: Dream or Reality", Chemical Reviews, 114(20), 10292-10368 (77 pages).

Malamis, Sotirios A., et al. "Comparison of precious metal doped and impregnated perovskite oxides for TWC application". Catalysis Today, vol. 258, pp. 535-542 (2015).

Extended European Search Report for associate EP patent application No. 22187610.5 dated Oct. 19, 2022 (12 pages).

\* cited by examiner

PEROVSKITE CATALYSTS AND USES THEREOF

CROSS REFERENCE TO RELATED APPLICATIONS

This application is a divisional of U.S. Ser. No. 16/349,936, filed May 14, 2019, now U.S. Pat. No. 11,179,704, issued Nov. 23, 2021, which was a § 371 U.S. National Stage of International Application PCT/US2017/061436, filed Nov. 14, 2017, which claims the benefit of 62/421,568, filed Nov. 14, 2016, Zheng et al., entitled "Perovskite Catalysts and Uses Thereof", the contents of which are hereby incorporated by reference in their entireties.

1. FIELD

The present disclosure provides perovskite catalytic materials and catalysts comprising platinum-group metals and perovskites. These catalysts may be used as oxygen storage materials with automotive applications, such as three-way catalysts. They are also useful for water or $CO_2$ reduction, or thermochemical energy storage.

2. BACKGROUND

2.1. Introduction

Perovskite materials have general chemical composition of $ABO_{3-\delta}$, where A and B are cations that may have multiple valence states, and are stable in octahedral and dodecahedral environments [1]. The perovskite structure is obtained when the Goldschmidt's tolerance factor (t) is within the range of 0.7<t<1, while t is calculated by $t=(r_A+r_O)/\sqrt{2}(r_B+r_O)$, where $r_A$, $r_B$, and $r_O$ are the ionic radii for the $A^{n+}$, $B^{m+}$, and $O^{2-}$ [2,3]. Perovskite can exhibit significant swings in oxygen non-stoichiometry δ through the reaction with gas phase oxygen with the following reaction Eq. 1 [4]. δ may vary with temperature and gas phase oxygen partial pressure, and can be tailored by doping A and/or B sites with appropriately selected cations. The profound oxygen mobility within perovskites makes them desired candidates for a wide variety of applications including water and/or $CO_2$ reduction, and thermochemical energy storage, and chemical-looping combustion [4-9].

$$ABO_{3-\delta} \rightleftharpoons ABO_{3-\delta-\Delta\delta} + \tfrac{1}{2}\Delta\delta O_2 \qquad (1)$$

Oxygen storage material (OSM) is an essential component in modern three-way catalysts (TWC) for automotive emissions control. Modern TWC, a supported bimetallic Pd—Rh catalyst deposited on stabilized γ-$Al_2O_3$, allows conversions of CO, hydrocarbons HCs, and $NO_x$ to innocuous compounds $CO_2$, $H_2O$, and $N_2$ [10]. The TWC mode is operated within a narrow stoichiometric air-to-fuel ratio (λ=1), when the optimum conversions of all three pollutants are reached [11]. The delicate control of the λ value is chemically assisted by $Ce_xO_y$, well known for its high oxygen storage capacity (OSC) due to the function of $Ce^{4+}/Ce^{3+}$ redox pair. The $Ce_xO_y$ is commercially incorporated into the γ-$Al_2O_3$ support to enhance the catalyst performance with the redox chemistry shown as Eq. (2) and (3).

$$2CeO_2+CO \rightarrow Ce_2O_3+CO_2 \text{ (at slightly fuel rich, } \lambda<1) \qquad (2)$$

$$Ce_2O_3+\tfrac{1}{2}O_2 \rightarrow 2CeO_2 \text{ (at slightly fuel lean, } \lambda>1) \qquad (3)$$

In recent years the family of rare earths, including cerium, experienced a rapid increase in price and decrease in availability, upsetting the markets and initiating a search for methods to reduce their concentrations in the OSC [12].

Meanwhile, with the rapid increase of vehicle population and more stringent automotive emissions regulation, which requires as high as 96% conversion of all pollutants, improvements of TWC performance by broadening operation window of the stoichiometric air-to-fuel ratios are of high interest [13]. Furthermore, TWC, including the active metal (platinum group metals (PGM) metals) and the support materials (with $Ce_xO_y$—$ZrO_2$-type OSM incorporated), may experience deactivation under fuel cutoff, an engine mode for enhanced fuel economy but exposes catalyst to a high temperature (c.a. >1000° C.) lean oxidative condition [13,14]. Perovskites possess not only excellent redox property but also high chemical/structural stability [15]. Preliminary development of perovskite-type OSMs by selecting transition metals with their low cost, large abundance and availability, remarkable redox properties, and good thermal stability would be a reasonable research strategy. Further research effort would require the development of advanced TWC by incorporation of PGM group metals into the novel perovskite structures with outstanding OSC capacity. Enhanced catalyst activity and stability were previously reported by incorporating noble metals into the perovskite structures, which stabilize the metal against sintering, reaction with the support, and volatilization [16-20].

The oxygen mobility in perovskite increases with the amount of available oxygen vacancies. Doping of A and B sites with cations influences the oxygen mobility by introducing structural defects (anionic or cationic vacancies) [21]. Previous XRD analysis confirmed that doping Ca, Sr and Al can be used to modify the La—Mn perovskite structure by varying the dopant type, position and doping extent [6]. When the A-sites are partially substituted by cations with lower valance, such as alkali metal ions, the oxidation state of the B-site cations will be increased or some oxygen vacancies are generated in order to maintain the electrical neutrality [22]. For example, when $La^{3+}$ is partially replaced by $Sr^{2+}$, the charge compensation is accomplished by increasing the unstable B ion amounts and oxygen vacancies, thereby facilitating diffusion of oxygen from bulk to surface [23]. The nature of the B-site cation modifies the morphology, structural symmetry, the charge compensation mechanism and the redox properties [3]. For air-$H_2$ cyclic redox reactions, perovskites with La on A sites, and Co or Mn on B sites were found to be the most active [9,24]. Efforts were also made in order to further increase activity by partial substitution of the A cation by cations $Sr^{2+}$ and $Ce^{4+}$ to modify the valency ($Co^{3+}/Co^{2+}$ or $Mn^{4+}/Mn^{2+}$) concentrations and oxygen mobility [1]. Klimkowicz, et al, reported that perovskite $La_{0.5}Sr_{0.5}Co_{0.5}Fe_{0.5}O_{3-\delta}$ exhibited enhanced reversible OSC than the state-of-the-art $Ce_xO_y$—$ZrO_2$ (CZO) system [2]. Ran, et al, showed results that the Ni-doped $LaMnO_{3-\delta}$ perovskite exhibited a very large dynamic OSC and high oxygen release rate, with $Mn^{4+}/Mn^{3+}$ redox pair contributing to the low-temperature redox reaction [13]. While these La-containing compositions have high redox energy storage capacity, they are not cost-effective for applications at lower temperature (<1000° C.), e.g. TWC mode, where more cost-effective compositions with earth-abundant cations are preferred.

Furthermore, doping PGM metals (Pd, Rh, or Pt) at B-site will also enhance catalytic activity and bring a "self-regeneration" effect.[25] It was first reported by Tanaka and colleagues and supported by other researchers that in PGM-containing perovskite solid solutions, PGM metal was reduced to a metallic state and disperse as small particles on the surface after reduction, and returned to solid solution after re-oxidation. This suggests that PGM-containing perovskite can regenerate itself under automotive fuel rich exhaust condition, and hence was named "An Intelligent Catalyst".[17,18,20,26] Excellent catalytic activity and stability were since found with PGM-doped perovskites, such as Pd doped $La_{0.7}Sr_{0.3}CoO_3$, $LaAlO_3$ and $LaFeO_3$, and Rh doped $CaTiO_3$, for HC, CO, and $NO_x$ conversions at transient air/fuel ratio oscillation conditions and at various temperatures.[27-29]

U.S. Pat. No. 4,321,250 (Hart, Phillips Petroleum) discloses rhodium (Rh) containing perovskite-type catalysts with about 1 up to about 20 percent of the B cation sites occupied by rhodium ions and the remaining B sites occupied by cobalt (Co). They disclose Catalyst A having the formula $La_{0.8}Sr_{0.2}Co_{0.95}Rh_{0.05}O_3$ and Catalyst A combined with an alumina support.

U.S. Pat. No. 6,680,036 (Fisher et al., Johnson Matthey) discloses three-way catalysts containing an oxygen storage component using a mixed oxide MnZr. They disclose catalysts loaded with palladium and comparative data with CeZr catalysts.

US Published Appn. No. 2004/0024071 (Meier) discloses perovskites with Group VIII metals (iron, cobalt, ruthenium, nickel) and their use as catalysts for the conversion of synthesis gas to hydrocarbons. Specifically disclosed are $LaFe_{0.5}Ti_{0.5}O_3$, $LaFe_{0.5}V_{0.5}O_3$, $LaFe_{0.5}Cr_{0.5}O_3$, $LaFe_{0.5}Mn_{0.5}O_3$ and $LaFe_{0.5}Zr_{0.5}O_3$.

U.S. Pat. No. 7,718,562 (Gandhi et al., Ford Global Technologies) discloses two component catalysts with a first catalyst perovskite-based and a second catalyst comprising precious metals. Specifically disclosed are $La_{0.5}Ba_{0.5}Co_{0.9}Pt_{0.1}O_3$, $La_{0.5}Ba_{0.5}Co_{0.9}Rh_{0.1}O_3$, $La_{0.5}Ba_{0.5}Fe_{0.3}Pt_{0.1}O_3$,

3. SUMMARY OF THE DISCLOSURE

The present disclosure provides in embodiment 1, a catalyst comprising a platinum-group metal and a perovskite having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$.

In embodiment 2, the catalyst of embodiment 1, wherein the platinum-group metal is Pd, Pt, Rh, Ru or a combination thereof.

In embodiment 3, the catalyst of embodiment 2, wherein the platinum-group metal is a combination of Pd and Rh.

In embodiment 4, the catalyst of any of embodiment 1-3, wherein the catalyst is on an $Al_2O_3$ support, a titania support, a zirconia support, a ceria support, a silica support, an alumina-silica support, a zeolite support, or a carbon support.

In embodiment 5, the catalyst of any of embodiment 1-4, wherein the catalyst is formed into a monolith honeycomb block.

In embodiment 6, the catalyst of any of embodiment 1-4, wherein the catalyst is coated on to a ceramic monolith honeycomb block.

In embodiment 7, the catalyst of embodiment 6, wherein the ceramic monolith honeycomb block is a cordierite compound.

In embodiment 8, the catalyst of any of embodiment 1-7, wherein the catalyst is a three-way catalyst.

In embodiment 9, the catalyst of any of embodiment 1-8, wherein the catalyst is used to catalyze the reduction of $NO_x$, and the oxidation of CO and hydrocarbons from an internal combustion engine.

In embodiment 10, the catalyst of embodiment 9, wherein the internal combustion engine is an automobile engine.

In embodiment 11, the catalyst of embodiment 9, wherein the internal combustion engine is operated under stoichiometric or lean air-to-fuel ratio conditions.

In embodiment 12, the catalyst of embodiment 9, wherein the internal combustion engine is fueled by diesel fuel, ethanol-gasoline hybrid fuel, gasoline or natural gas.

In embodiment 13, the catalyst of embodiment 12, wherein the ethanol-gasoline hybrid fuel is 85% ethanol 15% gasoline (E85).

In embodiment 14, a method for reducing emissions from an internal combustion engine is provided which comprises contacting an exhaust stream from the internal combustion engine with a catalyst comprising a platinum-group metal and a perovskite having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$.

In embodiment 15, the method of embodiment 14, wherein the platinum-group metal is Pd, Pt, Rh, Ru or a mixture thereof.

In embodiment 16, the method of any of embodiment 14-15, wherein the catalyst is on an $Al_2O_3$ support.

In embodiment 17, the method of any of embodiment 14-16, wherein the internal combustion engine is operated under stoichiometric air-to-fuel ratio conditions.

In embodiment 18, the method of any of embodiment 14-17, wherein the internal combustion engine is fueled by diesel fuel, ethanol-gasoline hybrid fuel, gasoline or natural gas.

In embodiment 19, an exhaust system for reducing emissions from an internal combustion engine is provided which comprises a catalyst comprising a platinum-group metal and a perovskite having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$ and a solid support.

In embodiment 20, a perovskite catalyst having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$.

In embodiment 21, the catalyst of embodiment 20 wherein x is a number defined by $0.2 \leq x \leq 0.8$.

In embodiment 22, the catalyst of any of embodiment 19-21, wherein the catalyst is in the form of a particle having a diameter greater than about 1.0 nm and less than about 10 mm.

In embodiment 23, the catalyst of embodiment 22, wherein the particle has a diameter greater than about 1.0 μm and less than about 50 μm.

In embodiment 24, a method of preparing a perovskite catalyst having the formula $CaCo_{1-x}Zr_xO_{3-\delta}$ is provided wherein x is a number defined by $0.02 \leq x \leq 0.98$; and $\delta$ is a number defined by $0.0 \leq \delta \leq 1.0$, the method comprising: (a) dissolving salts of Ca, Co and Zr to form a homogenous solution; (b) drying the solution; and (c) calcining and sintering to form the perovskite catalyst.

In embodiment 25, the method of embodiment 24, wherein the calcining is at about 300° C. to about 500° C. and the sintering is at about 800° C. to about 1400° C.

In embodiment 26, a method of producing hydrogen by thermo-chemical water splitting is provided, the method comprising: (a) heating a perovskite catalyst having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$ to release oxygen and generate an oxygen-depleted perovskite catalyst; (b) contacting the oxygen-depleted particles with water to release hydrogen and regenerate the perovskite catalyst.

In embodiment 27, the method of embodiment 26, wherein the hydrogen is produced in a fluidized bed reactor.

In embodiment 28, the method of embodiment 27, wherein the fluidized bed reactor is a circulating fluidized bed reactor, a bubbling fluidized bed reactor, a transport reactor or a chemical looping reactor.

In embodiment 29, the method of embodiment 26, wherein the hydrogen is produced in a fixed bed reactor.

In embodiment 30, the method of any of embodiment 26-29, wherein the perovskite catalyst is heated to a temperature of about 400° C. to about 1000° C.

In embodiment 31, the method of any of embodiment 26-30, further comprising using the hydrogen produced in a subsequent reactor to reduce $CO_2$ to CO and $H_2O$.

In embodiment 32, the method of any of embodiment 26-30, further comprising using the hydrogen produced in a subsequent reactor to reduce $CO_2$ or CO to hydrocarbons and $H_2O$.

In embodiment 33, the method of any of embodiment 26-30, further comprising using the hydrogen produced in a subsequent reactor to reduce $CO_2$ or CO to alkanes or alkenes and $H_2O$.

In embodiment 34, the method of any of embodiment 26-30, further comprising using the hydrogen produced in a subsequent reactor to produce aldehydes from mixtures of CO and alkenes.

In embodiment 35, the method of any of embodiment 26-30, further comprising using the hydrogen produced in a subsequent reactor for hydrotreating or hydroprocessing to upgrade crude or heavy petroleum or biomass oil feedstocks.

In embodiment 36, the method of embodiment 31-33, wherein the $CO_2$ is produced in a chemical looping combustion fuel reactor.

In embodiment 37, a method of reducing $CO_2$ to CO is provided, the method comprising: (a) heating a perovskite catalyst having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$ to release oxygen and generate an oxygen-depleted perovskite catalyst; (b) contacting the oxygen-depleted perovskite catalyst with $CO_2$ to remove oxygen, release CO and regenerate the perovskite catalyst.

In embodiment 38, a system for the thermo-catalytic splitting of water to produce hydrogen is provided, the system comprising: (a) an oxygen evolution reactor to heat a perovskite catalyst having the formula $CaCo_{1-x}Zr_xO_{3-\delta}$ wherein x is a number defined by $0.02 \leq x \leq 0.98$; and $\delta$ is a number defined by $0.0 \leq \delta \leq 1.0$ to generate an oxygen-depleted perovskite catalyst and release oxygen; (b) a hydrogen evolution reactor to react the oxygen-depleted perovskite catalyst with water vapor and to regenerate the perovskite catalyst and produce hydrogen; and (c) a device configured to return the regenerated perovskite catalyst to the oxygen evolution reactor.

In embodiment 39, the system of embodiment 38, wherein the oxygen evolution reactor is a fluidized bed reactor.

In embodiment 40, the system of any of embodiment 38-39, wherein the hydrogen evolution reactor is a fluidized bed reactor.

In embodiment 41, the system of embodiment 38, wherein the hydrogen evolution reaction fluidized bed is a riser reactor.

In embodiment 42, the method of embodiment 38, wherein either the oxygen evolution reactor or the hydrogen evolution reactor is a fixed bed reactor.

In embodiment 43, the system of any of embodiment 38-42, wherein the hydrogen is used to reduce $CO_2$ in an exhaust gas from a combustion process.

In embodiment 44, the system of any of embodiment 38-43, wherein the hydrogen is used for thermal energy storage.

In embodiment 45, the system of any of embodiment 38-44, wherein the system is integrated into a chemical manufacturing system and facility that provides energy for water splitting reactions while minimizing the energy losses.

In embodiment 46, a catalyst is provided comprising a platinum-group metal and a perovskite having the formula $(La_{1-y}Ca_y)_{1-x}Mn_xO_{3-\delta}$, $La_{1-x}(Co_{1-y}Ru_y)_xO_{3-\delta}$, $(La_{1-y}Sr_y)_{1-x}Co_xO_{3-\delta}$, $Sr_{1-x}(Co_{1-y}Fe_y)_xO_{3-\delta}$, $(Sr_{1-y}Ca_y)_{1-x}Fe_xO_{3-\delta}$; x is a number defined by $0.02 \leq x \leq 0.98$; y is a number defined by $0.02 \leq y \leq 0.98$; and $\delta$ is a number defined by $0.0 \leq \delta \leq 1.0$.

In embodiment 47, the catalyst of embodiment 46, wherein y is a number defined by $0.15 \leq y \leq 0.85$.

In embodiment 48, the catalyst of any of embodiment 46-47, wherein x is a number defined by $0.3 \leq x \leq 0.7$.

In embodiment 49, the catalyst of any of embodiment 46-48, wherein the platinum-group metal is Pd, Pt, Rh, Ru, or a mixture thereof.

In embodiment 50, the catalyst of embodiment 49, wherein the platinum-group metal is a mixture of Pd and Rh.

In embodiment 51, the catalyst of any of embodiment 46-50, wherein the catalyst is on an $Al_2O_3$ support, a titania support, a zirconia support, a ceria support, a silica support, an alumina-silica support, a zeolite support, or a carbon support.

In embodiment 52, the catalyst of any of embodiment 46-51, wherein the catalyst is formed into a monolith honeycomb block.

In embodiment 53, the catalyst of embodiment 52, wherein the catalyst is coated on to a ceramic monolith honeycomb block.

In embodiment 54, the catalyst of embodiment 53, wherein the ceramic monolith honeycomb block is a cordierite compound.

In embodiment 55, the catalyst of any of embodiment 46-54, wherein the catalyst is a three-way catalyst.

In embodiment 56, the catalyst of any of embodiment 46-54, wherein the catalyst is used to catalyze the reduction of $NO_x$ or the oxidation of CO or hydrocarbons from an internal combustion engine.

In embodiment 57, the catalyst of embodiment 56, wherein the internal combustion engine is an automobile engine.

In embodiment 58, a method for reducing emissions from an internal combustion engine is provided which comprises contacting an exhaust stream from the internal combustion engine with a catalyst comprising a platinum-group metal and a perovskite having the formula $(La_{1-y}Ca_y)_{1-x}Mn_xO_{3-\delta}$, $La_{1-x}(Co_{1-y}Ru_y)_xO_{3-\delta}$, $(La_{1-y}Sr_y)_{1-x}Co_xO_{3-\delta}$, $Sr_{1-y}(Co_{1-y}Fe_y)_xO_{3-\delta}$, $(Sr_{1-y}Ca_y)_{1-x}Fe_xO_{3-\delta}$; x is a number defined by $0.02 \leq x \leq 0.98$; y is a number defined by $0.02 \leq y \leq 0.98$; and $\delta$ is a number defined by $0.0 \leq \delta \leq 1.0$.

In embodiment 3, an exhaust system for reducing emissions from an internal combustion engine is provided which comprises a catalyst comprising a platinum-group metal and a perovskite having the formula $(La_{1-y}Ca_y)_{1-x}Mn_xO_{3-\delta}$, $La_{1-x}(Co_{1-y}Ru_y)_xO_{3-\delta}$, $(La_{1-y}Sr_y)_{1-x}Co_xO_{3-\delta}$, $Sr_{1-x}(Co_{1-y}Fe_y)_xO_{3-\delta}$, $(Sr_{1-y}Ca_y)_{1-x}Fe_xO_{3-\delta}$; x is a number defined by $0.02 \leq x \leq 0.98$; y is a number defined by $0.02 \leq y \leq 0.98$; and $\delta$ is a number defined by $0.0 \leq \delta \leq 1.0$ and a solid support.

4. BRIEF DESCRIPTION OF THE FIGURES

Figure 1B:
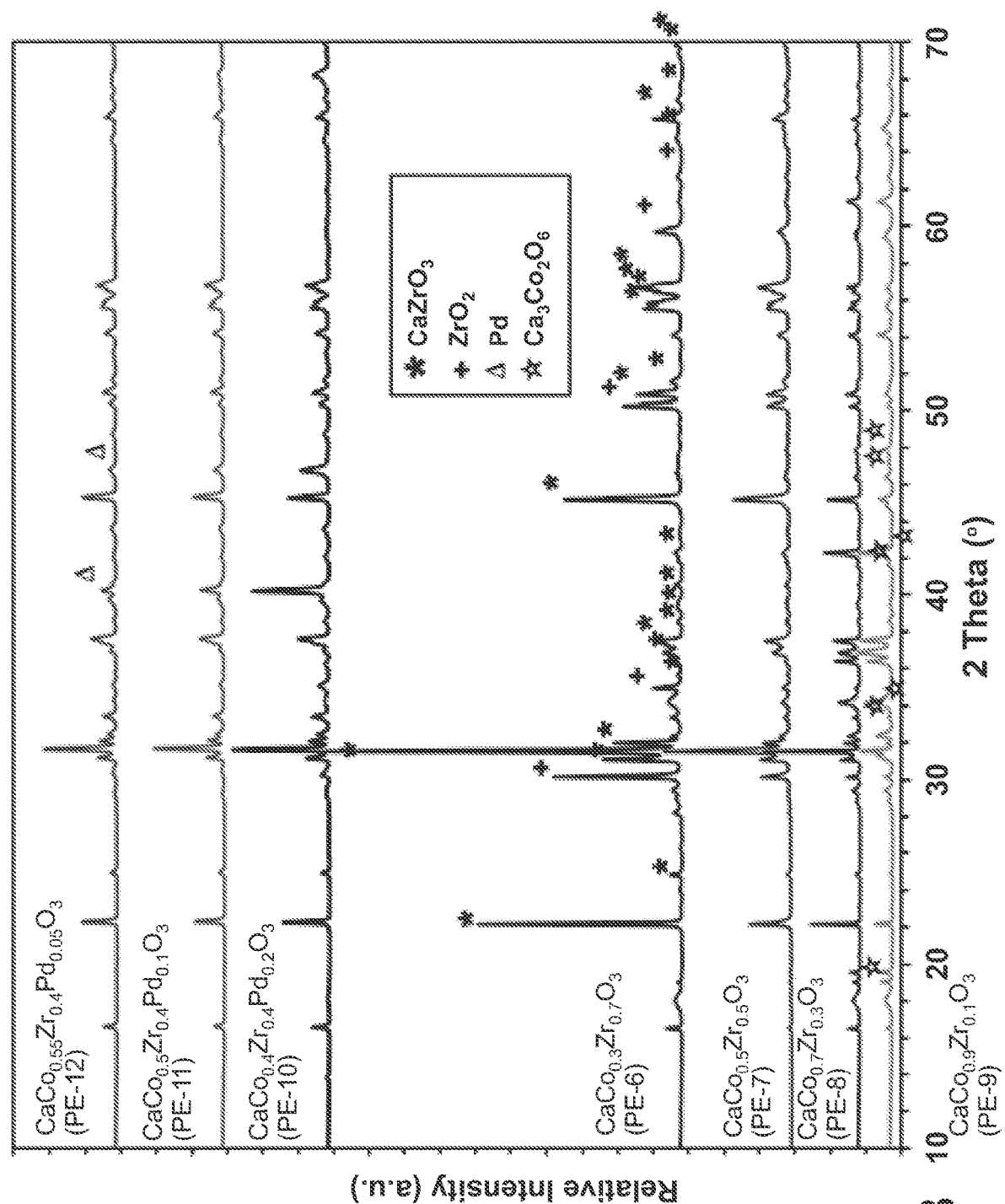

FIG. 1A-1B. X-ray diffraction (XRD) patterns of (FIG. 1A) state-of-the-art perovskite samples with different A- and B-site ions, (FIG. 1B) RTI's novel $CaCo_xZr_{1-x}O_{3-\delta}$ perovskite samples with and without Pd doping.

Figure 2:
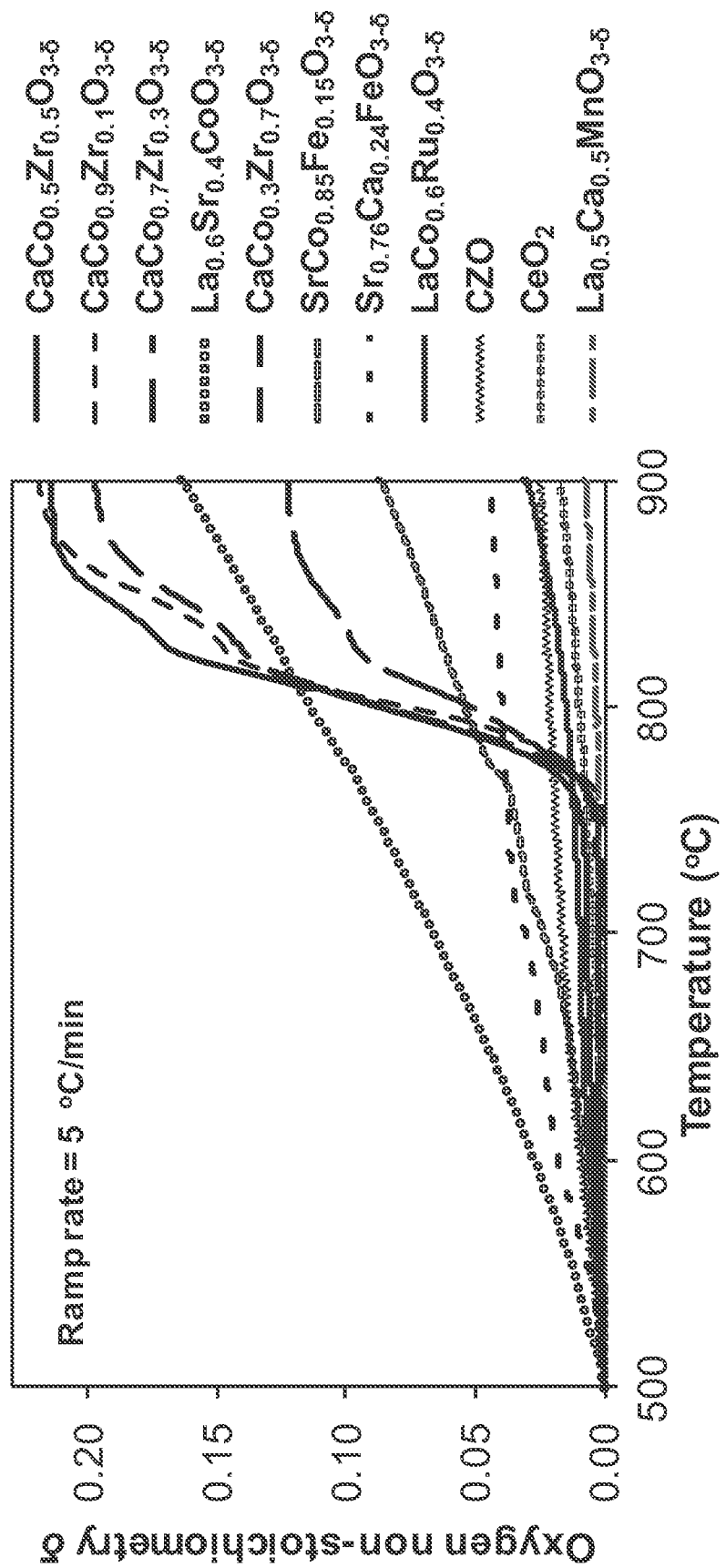

FIG. 2. Oxygen non-stoichiometry ($\delta$) as a function of sample temperature of as-synthesized perovskite samples, in comparison with commercial CZO and $CeO_2$. The result is calculated by using temperature programmed thermogravimetric (TG) data, assuming the onset temperature of thermal oxygen release is 500° C. (following complete sample degas).

Figure 3A:
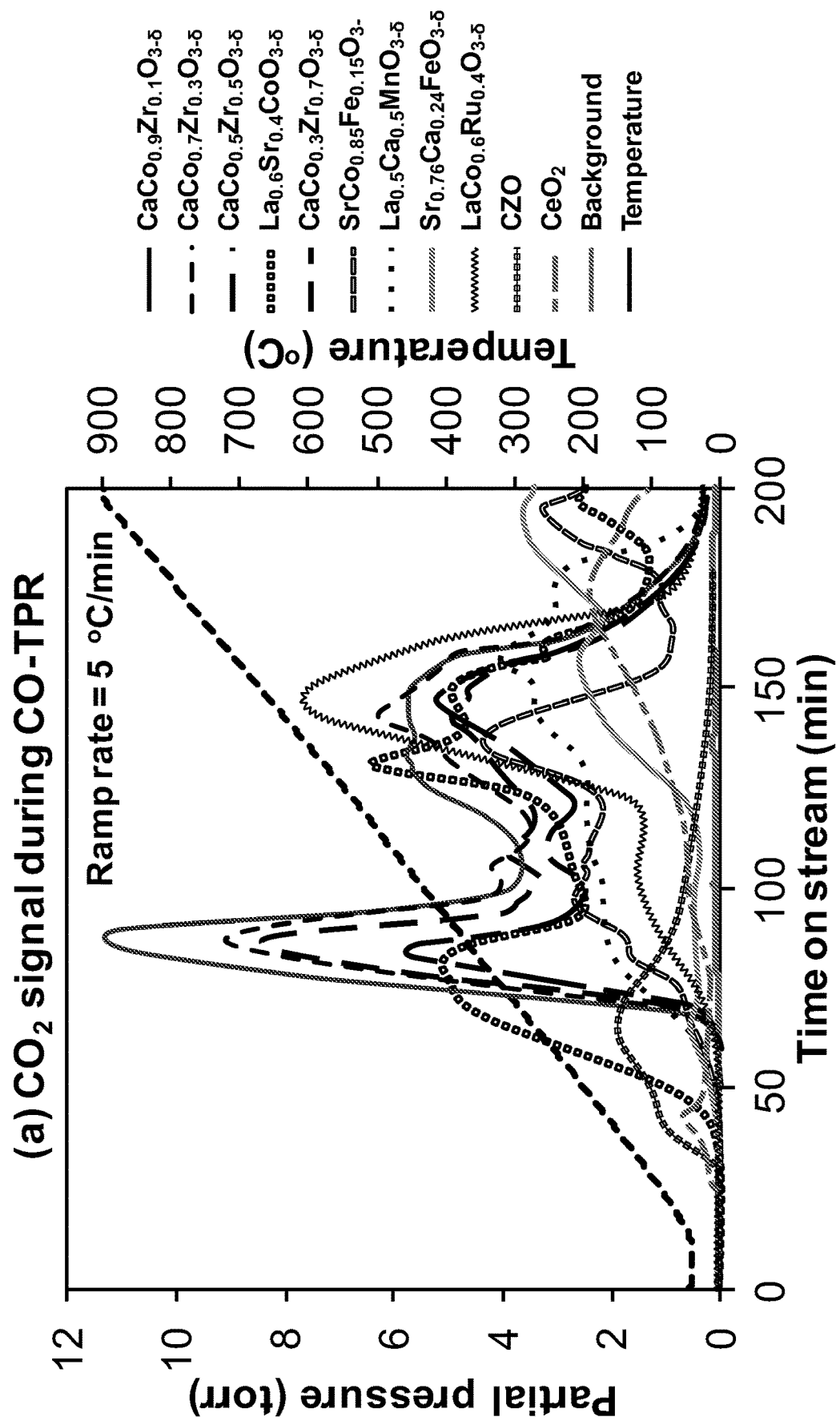
Figure 3B:
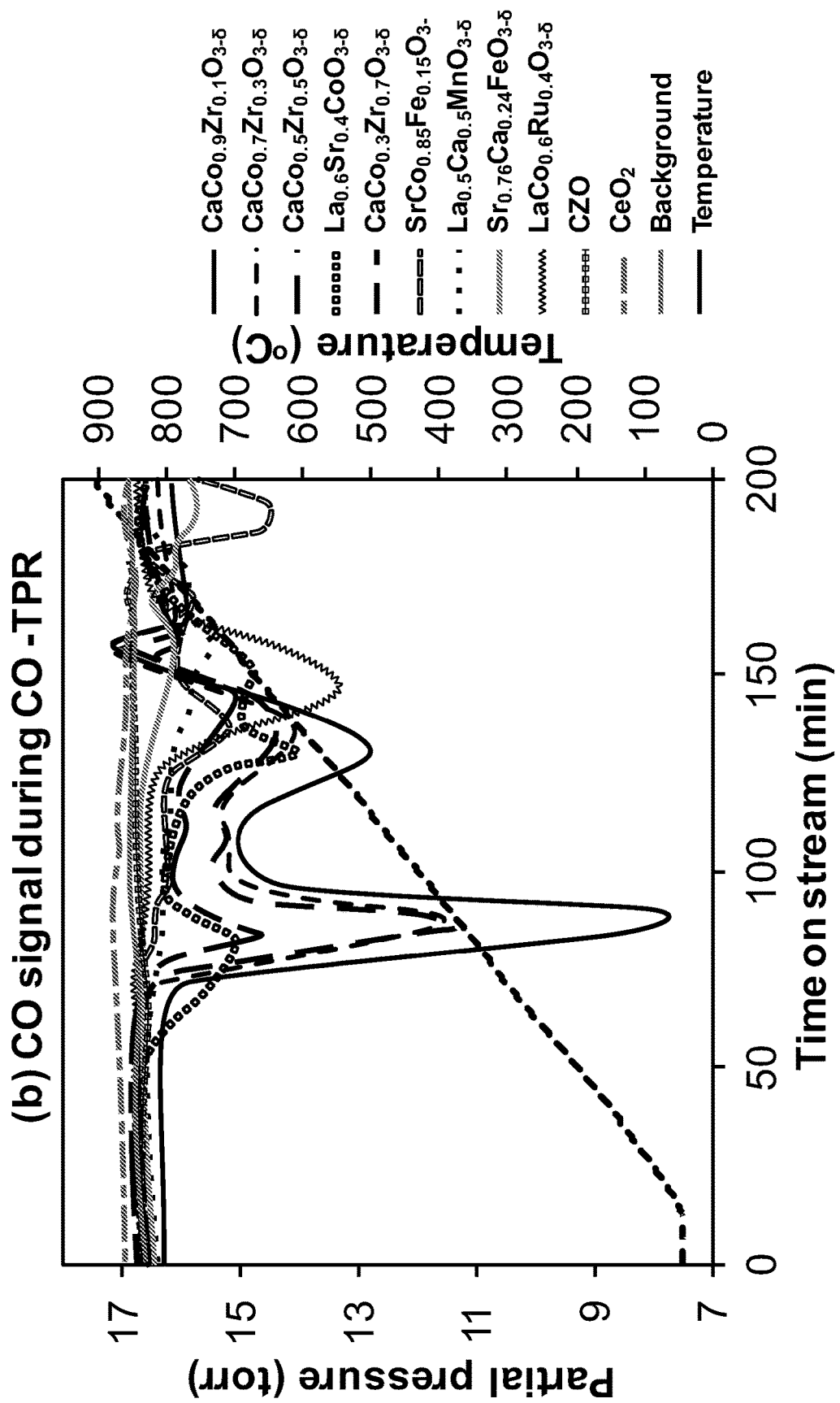

FIG. 3A-3B. $CO_2$ production and CO intake vs. reaction time on stream (TOS) and temperature of studied samples as represented by MS signals (in partial pressure) recorded during CO-TPR/MS measurements.

Figure 4:
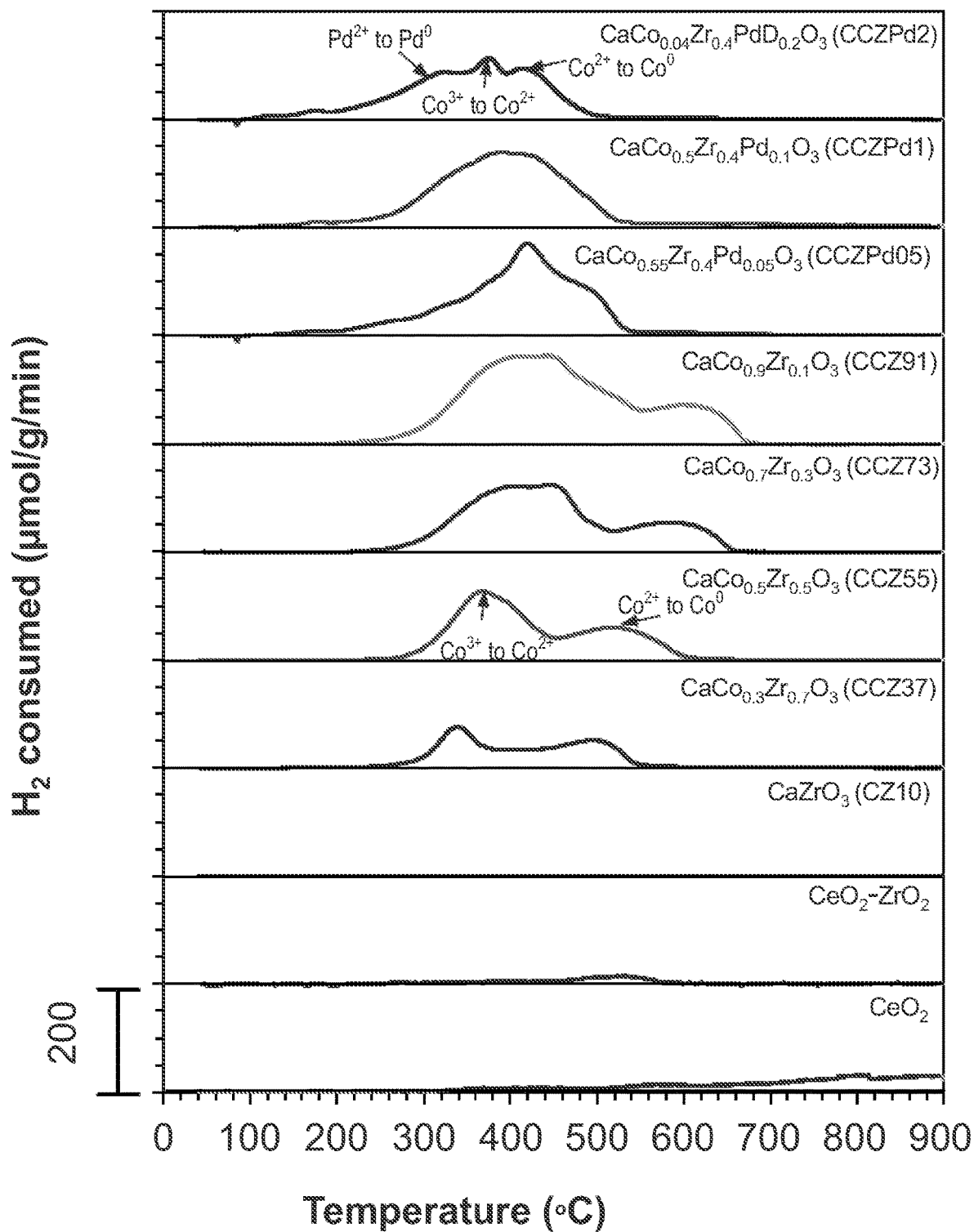

FIG. 4. $H_2$ consumption as a function of reaction time on stream and temperature of studied samples during $H_2$-TPR measurements (temperature ramp rate at 5° C./min).

Figure 5A:
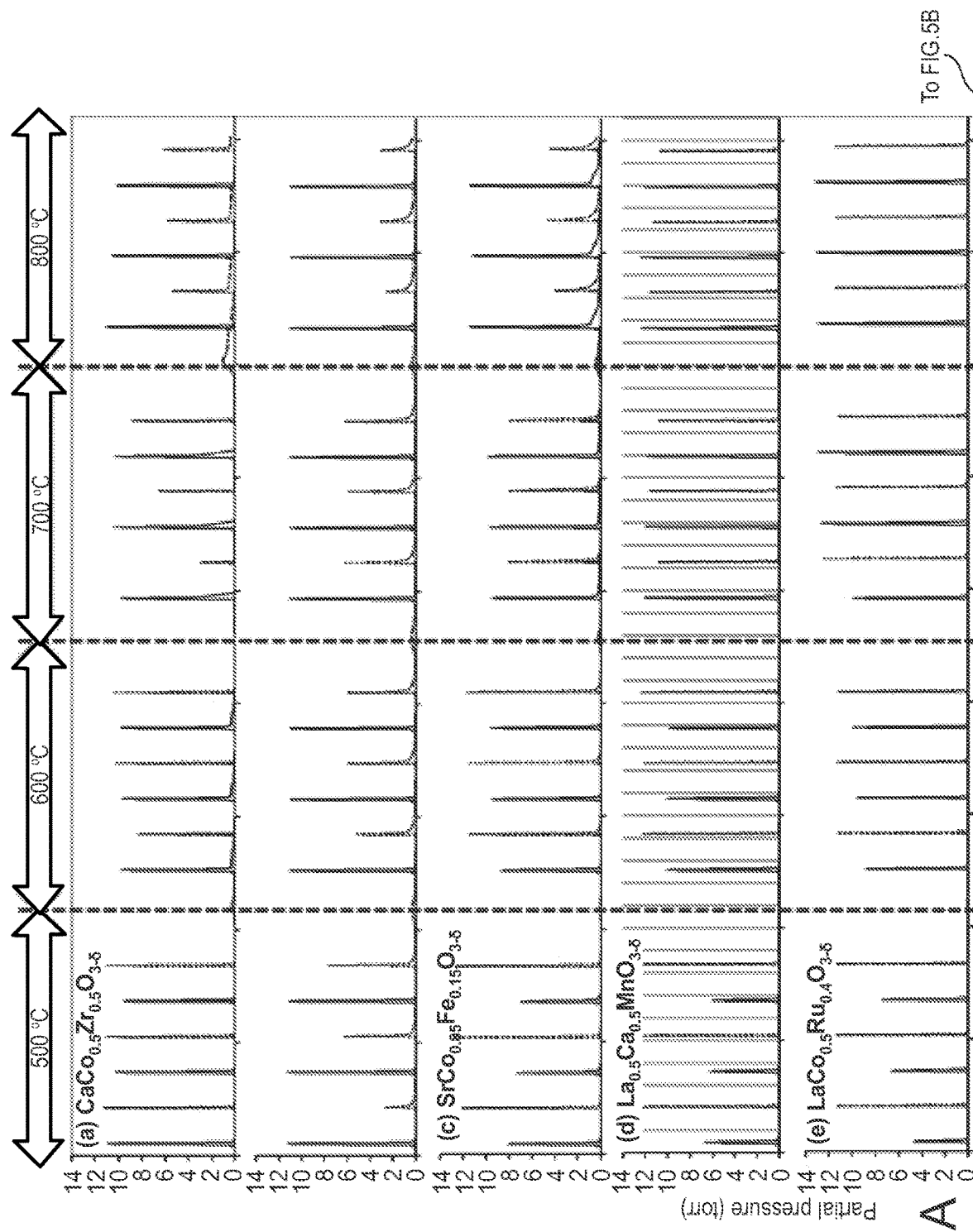
Figure 5B:
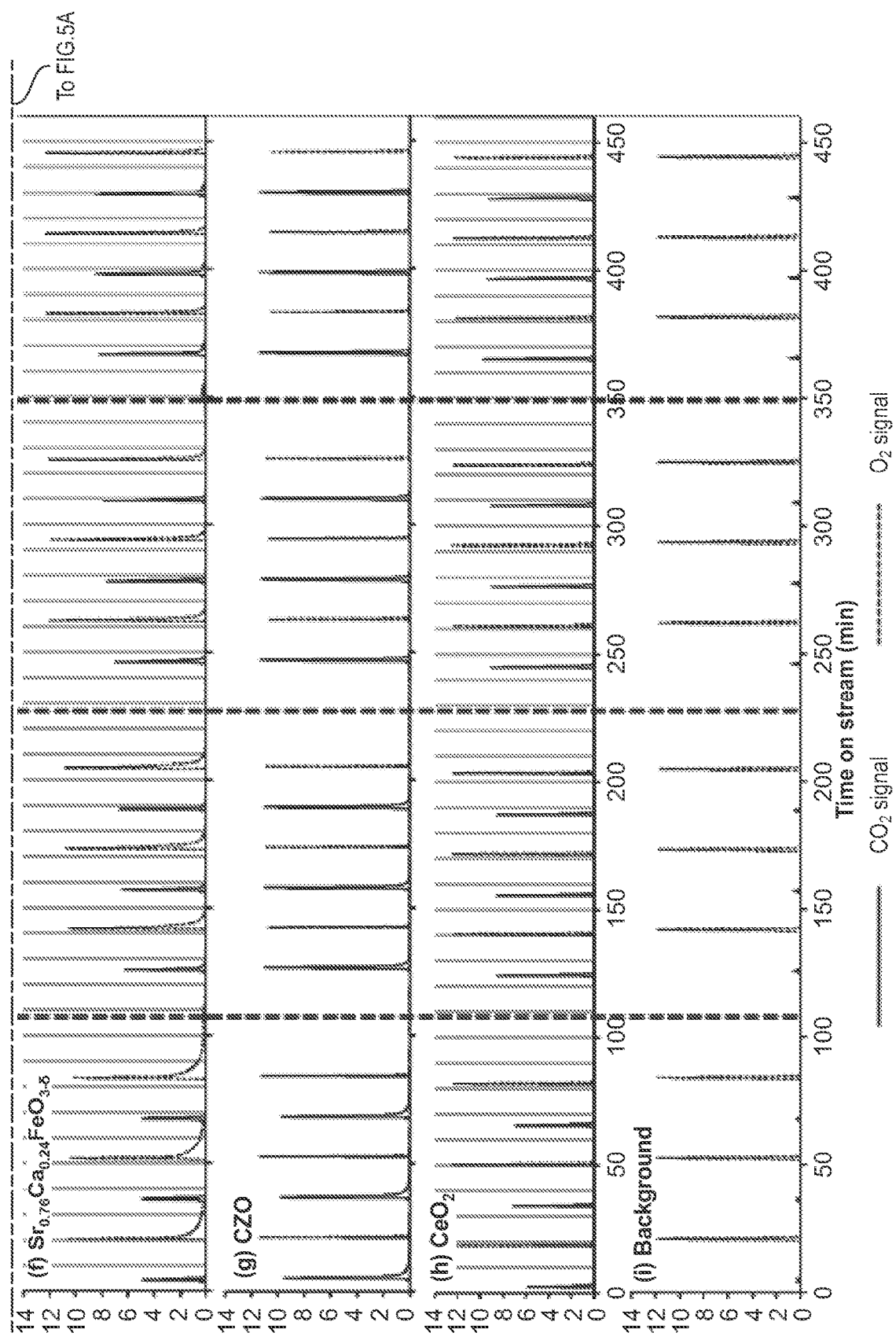

FIG. 5A-5B. $CO_2$ production and $O_2$ intake vs. reaction time on stream (TOS) of PE-1 to PE-6 perovskites, in comparison to $CeO_2$ and CZO, as represented by MS partial pressure signals during isothermal CO reduction-Air oxidation cyclic tests at 500, 600, 700, and 800° C.

Figure 6:
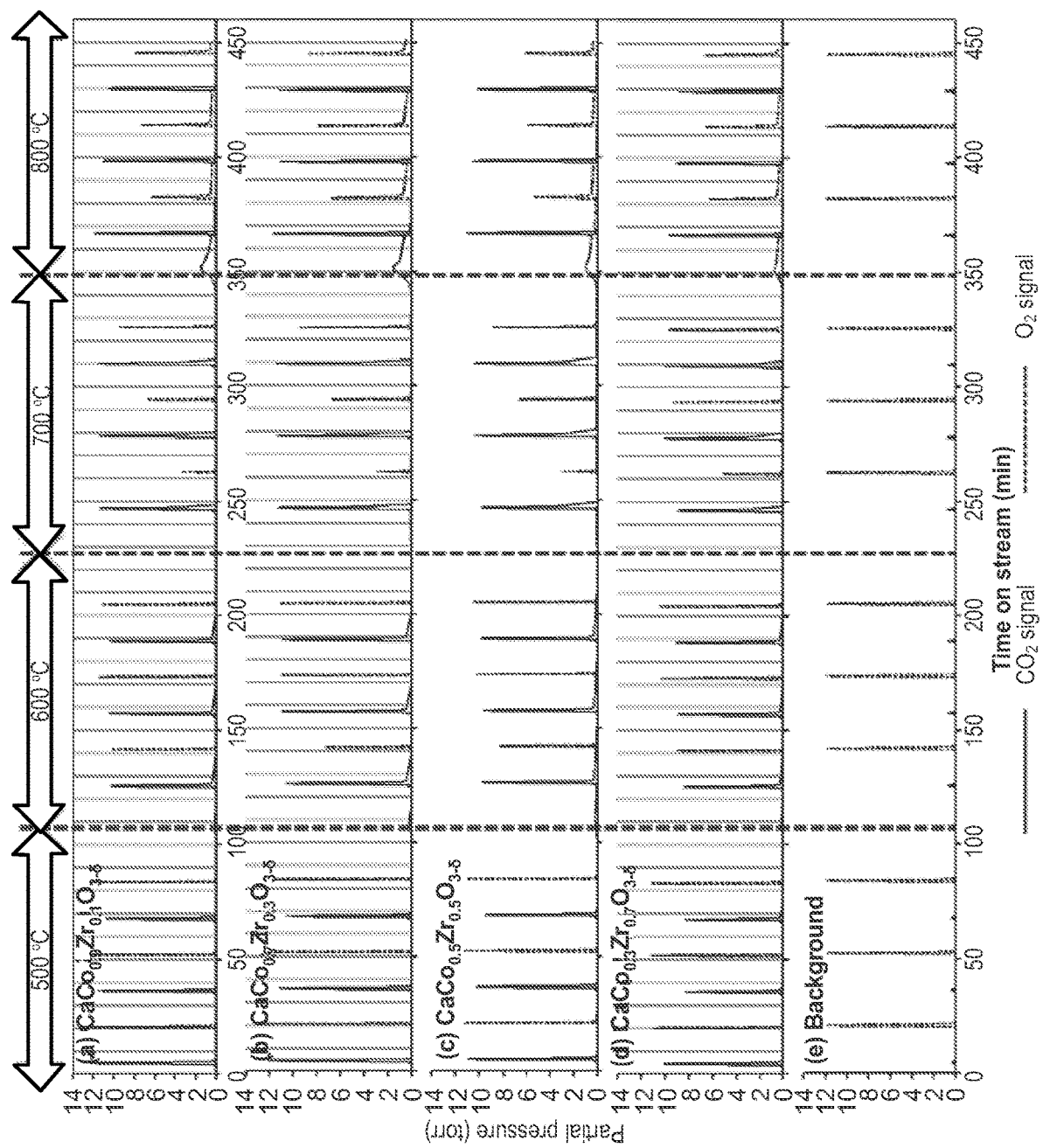

FIG. 6. $CO_2$ production and $O_2$ intake vs. reaction time on stream (TOS) of PE-6 to 9 perovskite samples ($CaCo_xZr_{1-x}O_{3-\delta}$, with x=0.3, 0.5, 0.7, or 0.9), as represented by MS partial pressure signals during isothermal CO reduction-Air oxidation cyclic tests at 500, 600, 700, and 800° C.

Figure 7A:
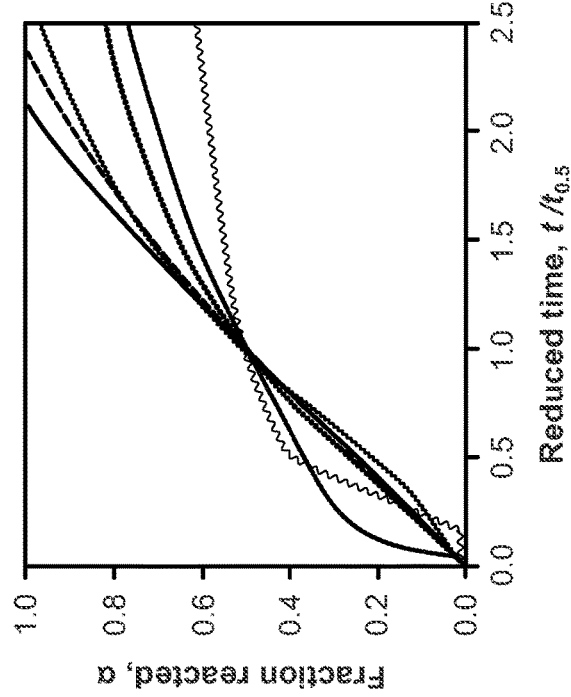
Figure 7B:
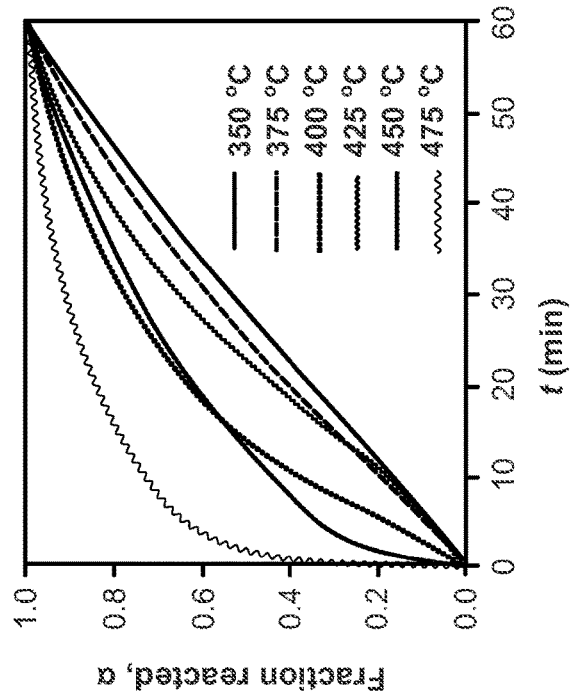
Figure 7C:
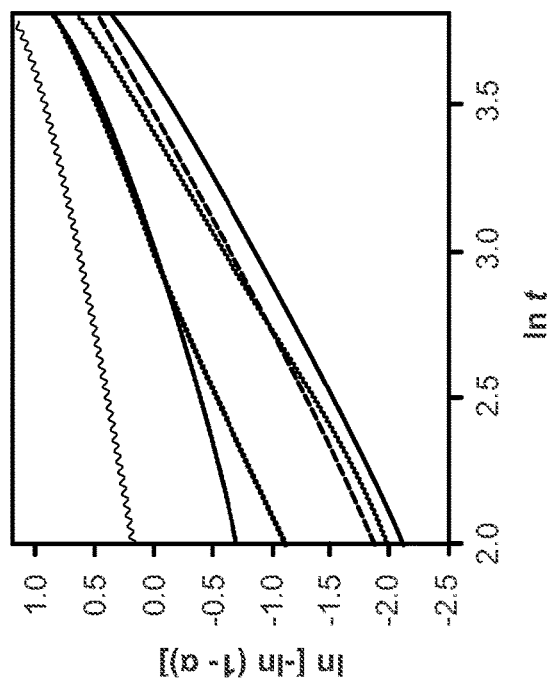

FIG. 7A-7C. Plots for oxygen-intake kinetic calculation of $CaCo_{0.5}Zr_{0.5}O_{3-\delta}$ perovskite sample showing (FIG. 7A) Fraction reacted $\alpha$ with time variation, (FIG. 7B) Fraction reacted $\alpha$ against reduced time $t/t_{0.5}$, and (FIG. 7C) $\ln[-\ln(1-\alpha)]$ as a function of $\ln t$ (with t in min) for the determination of reaction mechanisms at temperatures varied from 350° C. to 475° C.

Figure 8:
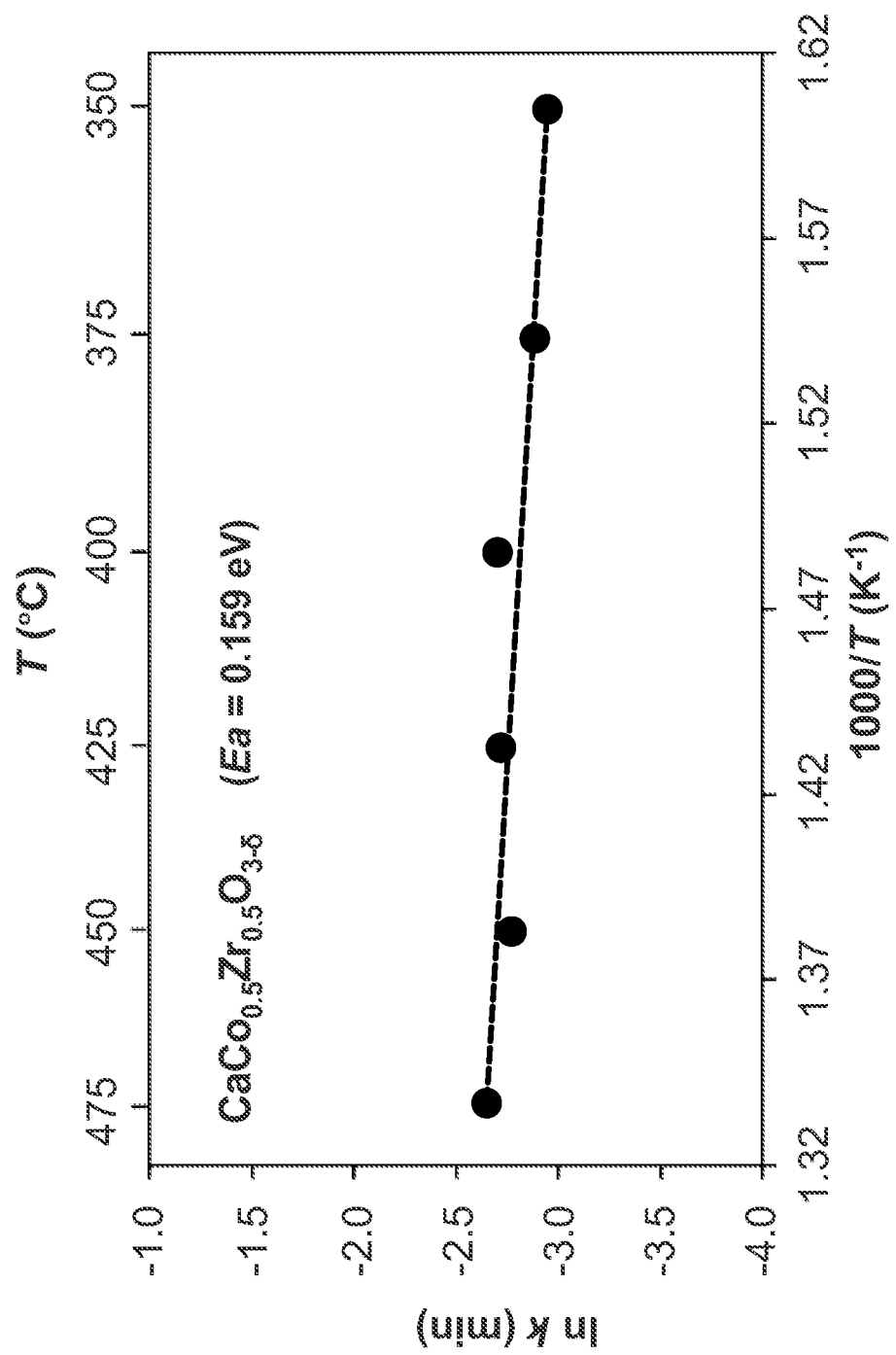

FIG. 8. Temperature dependent-reaction rate constants k in natural log scale as a function of inverse temperature for the calculation of reaction activation energy for $CaCo_{0.5}Zr_{0.5}O_{3-\delta}$ perovskite. The k value is achieved by fitting reaction data with various kinetic models, and first-order kinetic model was selected.

Figure 9:
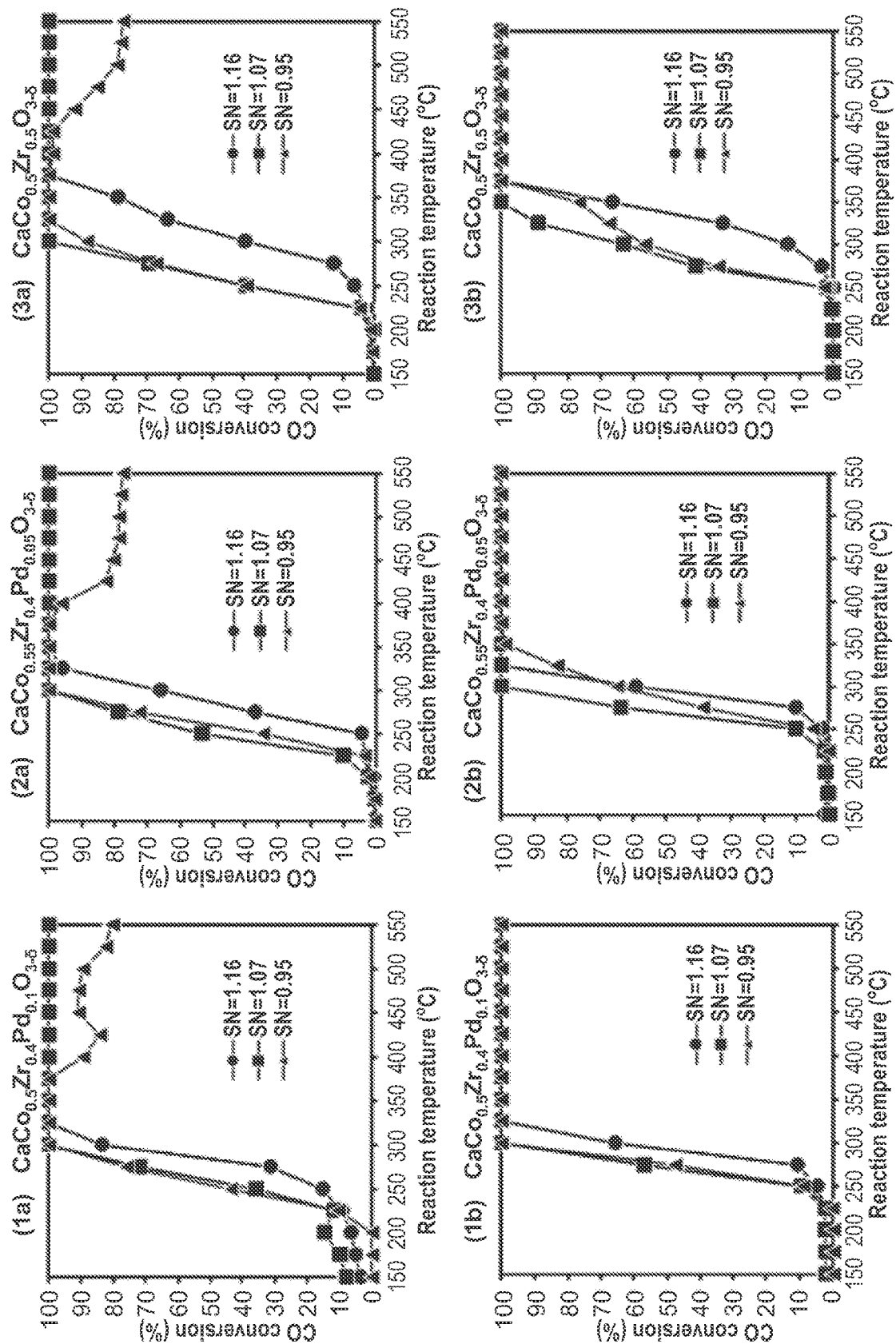

FIG. 9. (1) CO and (2) $C_3H_8$ conversions during catalytic oxidation tests over (Panel 1a/2a) $CaCo_{0.5}Zr_{0.4}Pd_{0.1}O_{3-\delta}$, (Panel 1b/2b) $CaCo0.55Zr_{0.4}Pd_{0.05}O_{3-\delta}$ and (Panel 1c/2c) $CaCo_{0.5}Zr_{0.5}O_{3-\delta}$ perovskite with simulated exhaust feed at stoichiometric numbers (SNs) of 1.16, 1.07 and 0.95.

5. DETAILED DESCRIPTION OF THE DISCLOSURE

5.1. Definitions

While the following terms are believed to be well understood by one of ordinary skill in the art, the following definitions are set forth to facilitate explanation of the presently disclosed subject matter.

The term "oxygen storage material" (OSM) as used herein means a stable material that has the capacity to both reversibly take up with gas phase oxygen and release the oxygen. In one embodiment, such as automobile exhaust, OSMs may take up oxygen from $NO_x$ or release oxygen for the oxidation of hydrocarbons or carbon monoxide. The perovskite catalysts described herein are OSMs. The perovskite catalysts may be combined with conventional OSMs such as $Ce_xO_y$—$ZrO_2$ (CZO) mixed oxides.

The term "perovskite" means a metal oxide of the formula $ABO_{3-\delta}$ or $A^1A^2B^1B^2O_{3-\delta}$ having a cubic crystalline form. The cations A and B are metals that may have multiple valence states, and are stable in both octahedral and dodecahedral environments.

The term "platinum-group metal" or (PGM) means a group VIII metal from the periodic table. Preferred PGMs are Pd, Pt, Rh, Ru or combinations thereof.

The term "three-way catalyst" or (TWC) means a substance that enables the oxidation of CO, unburnt hydrocarbons (HCs) or the reduction of $NO_x$ to $N_2$ to proceed at a usually faster rate or at a lower temperature. The three chemical reactions may be simultaneous or may occur in a staged catalytic system such as the TWC systems disclosed in U.S. Pat. No. 7,718,562 where a first catalyst reduces the $NO_x$ and a second catalyst oxidizes the CO and HCs. In a staged catalytic system, the perovskites disclosed herein may be present as a component of either the first stage catalyst, the second stage catalyst, or both stage catalysts.

Throughout the present specification, the terms "about" and/or "approximately" may be used in conjunction with numerical values and/or ranges. The term "about" is understood to mean those values near to a recited value. For example, "about 40 [units]" may mean within ±25% of 40 (e.g., from 30 to 50), within ±20%, ±15%, ±10%, ±9%, ±8%, ±7%, ±6%, ±5%, ±4%, ±3%, ±2%, ±1%, less than ±1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

Throughout the present specification, numerical ranges are provided for certain quantities. It is to be understood that these ranges comprise all subranges therein. Thus, the range "from 50 to 80" includes all possible ranges therein (e.g., 51-79, 52-78, 53-77, 54-76, 55-75, 60-70, etc.). Furthermore, all values within a given range may be an endpoint for the range encompassed thereby (e.g., the range 50-80 includes the ranges with endpoints such as 55-80, 50-75, etc.).

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising" will be understood to imply the inclusion of a stated element, integer or step, or group of elements, integers or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

The following Examples further illustrate the disclosure and are not intended to limit the scope. In particular, it is to be understood that this disclosure is not limited to the particular embodiments described, which as such may, of course, vary. It is also to be understood that the terminology used herein is for the purpose of describing particular embodiments only, and is not intended to be limiting, since the scope of the present disclosure will be limited only by the appended claims.

6. EXAMPLES

The present study focuses on a systematic screening of advanced perovskites as potential substitutes for commercial CZO in TWC structure for automotive applications. Some perovskite compositions used for material synthesis were selected based on the most recent literature reporting profound material performances in other applications [30-34]. $CaCo_xZr_{1-x}O_{3-\delta}$ perovskites were synthesized for the first time and reported here to show outstanding redox property and oxygen mobility compared to the current state-of the-art perovskite materials and the commercial CZO. CO- and $H_2$-temperature programmed oxidation measurements, and dynamic CO-air redox cyclic tests were performed to examine the CO and oxygen storage capacities of the as-synthesized materials, in comparison with the commercial CZO and $CeO_2$. Oxygen non-stoichiometry measurements were applied to study the correlation between temperature-dependent oxygen vacancy population and the material redox property. X-ray fluorescence, X-ray diffraction, and BET surface area measurements were used to characterize the studied materials. The kinetic data of the oxygen intake of the best performing perovskite materials is included. The study aims at providing a comprehensive comparison of the oxygen storage/release capacities of the current state-of-the-art perovskite materials, and preliminary results for the development of high performing perovskite materials in automotive and other potential applications.

2. Experimental 2.1. Perovskite Material Synthesis

Perovskites with target compositions of $CaCo_xZr_{1-x}O_{3-\delta}$ (x=0, 0.3, 0.5, 0.7 and 0.9) and Pd-doped $CaCo_{0.6-y}Zr_{0.4}Pd_yO_{3-\delta}$ (y=0.05, 0.1 and 0.2) were synthesized using Pechini method.[35] Calcium nitrate tetrahydrate (Sigma-Aldrich, St. Louis, Mo.), cobalt (II) nitrate hexahydrate (STREM Chemical, Newburyport, Mass.), zirconium (IV) oxynitrate hydrate (Sigma-Aldrich) and palladium (II) nitrate dihydrate (Alfa Aesar, Tewksbury, Mass.) were used as the metal precursors. Stoichiometric amounts of metal nitrate salts were first dissolved in ethylene glycol (Acros Organics, Pittsburgh, Pa.), followed by the addition of citric acid (Fisher Chemical, Pittsburgh, Pa.), with input molar ratios of n(metal): n(citric acid): n(ethylene glycol)=2:3:9. A solution was formed at 150° C. and then was slowly heated to 250° C. under continuous stirring till a homogeneous gel was formed, which was then cooled to RT. Calcination was then performed at 400° C. for 4 hrs, followed by sintering at 1200° C. for 4 hrs in a high temperature oven with constant dry air flow (5 mL/min). Commercial $Ce_xO_y$—$ZrO_2$ (CZO, with Ce:Zr molar ratio of 1:4) and $CeO_2$ were respectively acquired from MEL Chemical (Flemington, N.J.) and Alfa Aesar. Other perovskites including $La_{0.6}Sr_{0.4}CoO_{3-\delta}$, $Sr_{0.76}Ca_{0.24}FeO_{3-\delta}$, $LaCo_{0.6}Ru_{0.4}O_{3-\delta}$, $SrCo0.85Fe_{0.15}O_{3-\delta}$, and $La_{0.5}Ca_{0.5}MnO_{3-\delta}$ were synthesized according to literature.[30-34]

2.2. Oxygen Non-Stoichiometry Study

The temperature-dependent oxygen non-stoichiometry (δ) of the as-synthesized perovskites samples were studied by temperature programmed thermogravimetric analysis (TGA) using a TA Q500 unit. Around 20 mg sample was first loaded onto a platinum pan, and degassed at 500° C. for 2 hrs in He at a flow rate of 60 mL/min. The weight loss of the degassed sample was then measured with increasing temperature from 500° C. to 900° C. at ramp rate of 5° C./min in helium at the same flow rate. The oxygen non-stoichiometry was correlated to the sample weight loss, assuming 500° C. was the onset temperature of the thermal oxygen release. The imaginary oxygen non-stoichiometry of commercial $Ce_xO_y$—$ZrO_2$ (CZO, with Ce:Zr molar ratio of 1:4, MEL Chemical) and $CeO_2$ (Alfa Aesar) were also calculated in comparison with the studied perovskites. A background measurement with an empty platinum pan was performed with the same reaction program to take into account the buoyancy effect.

2.3. CO-Temperature Programmed Reduction Measurements

CO-temperature programmed reduction (CO-TPR) measurements of the as-synthesized perovskite and commercial samples were performed using a Micromeritics AutoChem II 2920 reactor equipped with a built-in TCD detector, and with the reactor downstream connected to a benchtop quadrupole mass spectrometer (TA Discovery Mass Spectrometer). The TCD signal was used for the quantification of the CO intake, while the MS signal was used for product gas identification and semi-quantifiable analysis. Around 0.5 g sample sandwiched in thin quartz wool was first loaded into a U-shaped quartz reactor, which was housed in a thermal furnace with upper temperature limit of 1000° C. After degassing at 500° C. for 1 hr in He at a flow rate of 50 mL/min, the sample was heated from ambient temperature (25° C.) to 900° C. at 5° C./min in 20% CO/He, at a flow rate of 30 mL/min, while the TCD and MS responses were recorded every 0.1 second. The TCD calibration for the total signal (reduced CO and increased $CO_2$ amount) was performed by using both the CO and $CO_2$ linear calibration curves, and 20% CO/He was used as the reference gas. A background test with an empty reactor and the same reaction conditions was performed to create a baseline.

2.4. $H_2$-Temperature Programmed Reduction Measurements $H_2$-temperature programmed reduction ($H_2$-TPR) measurements of the as-synthesized perovskite and commercial samples were performed using the same above mentioned AutoChem reactor system. Around 0.5 g sample was first degassed at 500° C. for 1 hr in He at a flow rate of 50 mL/min, and then heated from ambient temperature (25° C.) to 900° C. at 5° C./min in 10% $H_2$/Ar, at a flow rate of 30 mL/min. The water generated during TPR was trapped instantly downstream to the reactor by using a propanol-liquid $N_2$ mixture coolant. The TCD calibration was performed with $H_2$ concentrations varied from 0 to 10% in Ar, and with 10% $H_2$/Ar as the reference gas. A background test with an empty reactor and the same reaction conditions was performed to create a baseline.

2.5. Dynamic Measurements of CO and Oxygen Storage Capacities

The oxygen mobility within the studied samples were further examined using dynamic isothermal CO-air redox cyclic tests by using the same above mentioned AutoChem reactor system. Samples were first degas sed in He (50 mL/min) at 500° C. for 2 hrs before cyclic tests. Each cycle was performed following the CO reduction-air oxidation order, respectively at 500° C., 600° C., 700° C., and 800° C., with 3 repetitive cycles at each reaction temperature. During the reduction, 20% CO/He flowed through the sample at a constant flow rate of 30 mL/min. During the oxidation, air (moisture removed) flowed through the sample at a constant flow rate of 30 mL/min. The reduction and oxidation durations were both kept at 0.5 min (30 sec). In between reduction and oxidation steps, He at a flow rate of 50 mL/min was used to purge the system residual gas. The $CO_2$ production during the reduction cycles, and the $O_2$ uptakes during the oxidation cycles were closely monitored by TCD and MS signals. A background test with an empty reactor was performed at the same cyclic conditions.

2.6. Isothermal Thermogravimetric Experiments for Reaction Kinetic Study

The reaction kinetics of best performing perovskite was studied by isothermal TG experiments using a TA Q500 unit. Approximately 20 mg of each studied sample was degassed at 500° C. in He (at 50 mL/min) for 1 hr, followed by pre-reduction in 20% CO/He (at 30 mL/min) for 1 hr at the same temperature. The pretreated sample was then placed in a shallow platinum pan and was heated to a target temperature (350, 375, 400, 425, 450, 475, or 500° C.) in flowing He at 60 mL/min. The flow was then switched to 5% $O_2$/He to gradually oxidize the sample after the target temperature was reached and a stable baseline was achieved, while the sample weight signal was recorded every 0.1 second during the whole process. A background measurement with empty platinum pan was performed at each reaction temperature to take into account the buoyancy effect. The kinetic models were adopted from Hancock's [29] and Motohashi' s [30] previous studies, with major calculation equations described accompanying the corresponding body text.

2.7. Catalyst Characterization 2.7.1. X-Ray Fluorescence (XRF) Analysis

X-ray fluorescence analyses (XRF) for elemental compositional study of the studied materials were performed with ARL Thermo Scientific PERFORMX Wavelength-Dispersive X-ray Fluorescence (WDXRF) instrument. A 5GN-type Rh target incident beam with ultra-thin 30 μm Be window was used to maximize light element response. The instrument was equipped with two detectors and seven analyzer crystals to achieve a broad elemental range. Sample data was processed using UniQuant, a standard software package that uses advanced fundamental parameters algorithms to determine elemental concentrations. Analysis is for seventy-nine elements and those elements above ten times the instrument calculated uncertainty are reported.

2.7.2. X-Ray Diffraction (XRD) Analysis

The phase identification was done by means of X-ray diffraction (XRD) analyses of the studied materials with a Thermo INEL Equinox 100 benchtop X-ray diffractometer. XRD patterns were collected with monochromatized Cu Kα radiation over the 2θ range of 20-70° with a total scanning duration of 1200 seconds at an instrument power setting of 40 kV and 0.9 mA. The scans were performed in validation of the instrument using the vendors $Y_2O_3$ standard yielded peak accuracy as compared to ICDD PDF reference values that fell well within the SOP-stated acceptable values of 0.05° of 2θ. All measurements were processed using Jade software.

2.7.3. BET Surface Area Analysis

BET surface areas of the studied materials were measured using an ASAP 2020 Plus Chemisorption unit. Each sample (around 0.2 g) was first degassed in vacuum (<500 μm Hg) at 350° C. for 4 hrs. The Multi-point BET surface area of the degassed sample was measured under partial pressure $P/P_0$ of 0.05 to 0.30 at liquid nitrogen temperature (77 K).

3. Results and Discussion 3.1. Structural Analysis of Studied Materials

The actual compositions of the as-synthesized perovskite samples were analyzed by XRF with replicate results within an error limit of <10%. The target (theoretical) and actual compositions of the studied materials are listed in Table 1. The differences between the two values for all perovskites are within allowable ranges. The analytical information of the commercial $Ce_xO_y$—$ZrO_2$ (CZO) and $CeO_2$ are provided by their manufactures. Table 1 also lists the tolerance factors (t) of the perovskites, calculated based on the theoretical material compositions. The t values were calculated based on the ionic radii of $Ca^{2+}$, $La^{3+}$, $Sr^{2+}$ for A-site ions, and $Co^{3+}$, $Fe^{3+}$, $Mn^{3+}$, $Ru^{3+}$, $Zr^{4+}$, and $Pd^{2+}$ for B-site ions. The t values of PE-1 to 9 samples are within the range of 0.8~0.92, suggesting stable orthorhombic perovskite structures.[3]

TABLE 1

Analytical data of as-synthesized $ABO_{3-δ}$ perovskite samples, and commercial $Ce_xO_y$—$ZrO_2$ (CZO) and $CeO_2$ samples.

| # | Target composition | Actual composition [a] | t [b] | $\bar{A}$ (m²/g) [c] |
|---|---|---|---|---|
| PE-1 | $La_{0.6}Sr_{0.4}CoO_{3-δ}$ | $La_{0.56}Sr_{0.47}Co_{1.03}O_{3-δ}$ | 0.91 | 1.16 |
| PE-2 | $Sr_{0.76}Ca_{0.24}FeO_{3-δ}$ | $Sr_{0.84}Ca_{0.21}Fe_{0.96}O_{3-δ}$ | 0.92 | 2.36 |
| PE-3 | $LaCo_{0.6}Ru_{0.4}O_{3-δ}$ | $La_{0.99}Co_{0.49}Ru_{0.44}O_{3-δ}$ | 0.86 | 2.58 |
| PE-4 | $SrCo_{0.85}Fe_{0.15}O_{3-δ}$ | $Sr_{1.10}Co_{0.82}Fe_{0.14}O_{3-δ}$ | 0.94 | 2.59 |
| PE-5 | $La_{0.5}Ca_{0.5}MnO_{3-δ}$ | $La_{0.50}Ca_{0.52}Mn_{1.08}O_{3-δ}$ | 0.89 | 2.09 |
| PE-6 | $CaCo_{0.3}Zr_{0.7}O_{3-δ}$ | $Ca_{1.33}Co_{0.37}Zr_{0.52}O_{3-δ}$ | 0.82 | 1.88 |
| PE-7 | $CaCo_{0.5}Zr_{0.5}O_{3-δ}$ | $Ca_{1.17}Co_{0.61}Zr_{0.36}O_{3-δ}$ | 0.84 | 3.19 |
| PE-8 | $CaCo_{0.7}Zr_{0.3}O_{3-δ}$ | $Ca_{1.12}Co_{0.79}Zr_{0.20}O_{3-δ}$ | 0.85 | 2.21 |
| PE-9 | $CaCo_{0.9}Zr_{0.1}O_{3-δ}$ | $Ca_{1.08}Co_{0.98}Zr_{0.07}O_{3-δ}$ | 0.86 | 1.76 |
| PE-10 | $CaCo_{0.4}Zr_{0.4}Pd_{0.2}O_3$ | $Ca_{1.12}Co_{0.0.43}Zr_{0.33}Pd_{0.25}O_3$ | 0.82 | 0.05 |
| PE-11 | $CaCo_{0.5}Zr_{0.4}Pd_{0.1}O_3$ | $Ca_{1.12}Co_{0.55}Zr_{0.32}Pd_{0.11}O_3$ | 0.83 | 0.03 |
| PE-12 | $CaCo_{0.55}Zr_{0.4}Pd_{0.05}O_3$ | $Ca_{1.16}Co_{0.61}Zr_{0.32}Pd_{0.06}O_3$ | 0.84 | 0.15 |
| CZO [d] | Ce:Zr molar ratio 1:4 | Ce:Zr molar ratio 1:4 | N/A | 215.80 |
| $CeO_2$ [e] | $CeO_2$ | $CeO_2$ | N/A | 15.52 |

Annotations:

[a] Material actual composition as measured by XRF, with repeatable results and acceptance limits of less than 10%;

[b] Theoretical tolerance factor (in the range of 0.75 to 1) for the perovskite material sample calculated based on the target compositions;

[c] Multi-point specific BET surface area $\bar{A}$ measured at liquid $N_2$ temperature (77K), at relative pressures ($P/P_0$) in the range of 0.05 to 0.30;

[d] Commercial CZO sample acquired from MEL Chemical, with material composition information provided;

[e] Commercial $CeO_2$ sample acquired from Alfa Aesar, with material composition information provided.

More detailed material structural information of the studied materials can be obtained from XRD analyses. FIG. 1A-1B plots the highly resolved XRD patterns of all the fresh samples. FIG. 1A presents the XRD patterns of as-synthesized perovskite samples PE-1 to 5 with different A- and B-site ions. The XRD pattern for $La_{0.6}Sr_{0.4}CoO_{3-\delta}$ (PE-1) is consistent with database (PDF #01-070-7597) and previous report [30], and is characteristic of the rhombohedral lattice structure. All the diffraction peaks for $Sr_{0.76}Ca_{0.24}FeO_{3-\delta}$ (PE-2) can be assigned to perovskite-type structure (PDF #01-082-2445) [31]. The diffraction pattern of the $LaCo_{0.6}Ru_{0.4}O_{3-\delta}$ sample (PE-3) show profiles corresponding to single perovskite structures (PDF #01-082-9769) without peaks attributable to ruthenium oxides [32]. The XRD pattern of $SrCo_{0.85}Fe_{0.15}O_{3-\delta}$ sample (PE-4) also agrees well with the previously reported perovskite structure without any impurity phases (PDF #04-014-2297)[33]. $La_{0.5}Ca_{0.5}MnO_{3-\delta}$ (PE-5) showed distinct peaks which correspond well to previously reported $La_{0.67}Ca_{0.33}MnO_3$ perovskite (PDF #04-014-6391).

The XRD patterns of the PE 6-12 novel perovskite samples with or without Pd doping are shown in FIG. 1B. Reflections at 2θ of 22.1, 31.0, 31.5, 32.0, 45.2, 50.2, 50.9, 51.6, 55.2, 55.9, 56.5, 56.7, 64.7, 65.8 and 66.9 were assigned to the main phase of orthorhombic Lakargiite $CaZrO_3$ perovskite matrix (JCPDS 01-080-6213); reflections at 2θ of 30.3, 35.1, 50.5, 60.0 and 63.0 were assigned to cubic Tazheranite $ZrO_2$ structure (JCPDS 04-002-8314); reflections at 2θ of 19.5, 32.5, 34.2, 41.6, 42.3, 46.4 and 47.8 were assigned to $Ca_3Co_2O_6$ phase (JCPDS 04-010-0812); and reflections at 2θ of 40.2 and 46.7 were assigned to Pd phase (JCPDS 01-089-4897).

For $CaCo_xZr_{1-x}O_3$ samples, with lower x values (higher Zr/Co ratio at B sites), higher perovskite main phase crystallinity was observed, while increased amount of $ZrO_2$ phase was detected. When x>0.7, notable amount of $Ca_3Co_2O_6$ phase was detected. This suggests that partial substitution of Co by Zr enhances the structural crystallinity of $CaCoO_3$. With x value of around 0.5, $CaCo_{0.5}Zr_{0.5}O_3$ processes optimum crystallinity and minimized impurity. Noteworthy, no side phases of Cobalt Oxides in any single form were identified when x<0.7, suggesting the Co was inside the perovskite unit cells.

For $CaCo_{0.6-y}Zr_{0.4}Pd_yO_3$ samples, the main phase remained $CaCo_xZr_{1-x}O_3$ perovskite, as the characteristic peaks matched those observed with $CaCo0.5Zr0.5O3$. Peaks characterizing Pd were observed, and the Pd phase amount increased with increasing Pd loading. No peak corresponding to PdO was shown. This suggests that among the doped Pd, some were incorporated into the perovskite bulk crystal structure (bulk $Pd^{2+}$), while others remained on the crystal surfaces (surface $Pd^0$). The existence of bulk $Pd^{2+}$ will be further evidenced by $H_2$-TPR result in the following text.

3.2. Temperature-Dependent Oxygen Non-Stoichiometry of As-Synthesized Perovskites The temperature-dependent oxygen non-stoichiometry (δ) of the as-synthesized perovskites and the commercial $CeO_2$ and CZO samples are compared in the temperature range of 500° C. to 900° C. in FIG. 2. Generally, δ values increase with increasing temperature. Remarkable differences in the δ increase rate are observed between perovskite and Ce-containing non-perovskite samples. Compared to perovskite samples, $CeO_2$ and CZO showed negligible variations in δ values with temperature. Among perovskite samples, PE-1 to 5 showed steady δ increase rate during the entire temperature programmed process, where PE-1 ($La_{0.6}Sr_{0.4}CoO_{3-\delta}$) was the leading material. Compared to PE-1 to 5, the oxygen release of $CaCo_xZr_{1-x}O_{3-\delta}$-type perovskites was a more thermally activated process, with δ values observed to increase exponentially at 780° C. Specifically, pronounced amount of oxygen vacancies were created in $CaCo_xZr_{1-x}O_{3-\delta}$ when x>0.3 when temperature reached 800~900° C.

3.3. Reducibility of As-Synthesized Perovskites in Comparison to Commercial Ceria-Based OSM CO-TPR/MS profiles of the as-synthesized perovskites and commercial ceria-based oxygen storage material (OSM) samples are presented by FIG. 3. No oxidation pretreatment was performed considering that the fresh samples as they were already exposed to oxidative calcination environments during material synthesis, i.e. 1200° C. in air for perovskite samples and around 550° C. in air for commercial $CeO_2$ and CZO samples. Complete sample degas pretreatments were applied prior to all the measurements. FIG. 3A-3B plots the semi-quantitative MS signals, in terms of partial pressure (in Torr) of the mass fraction, of respectively (FIG. 3A) $CO_2$ (mass of 44) and (FIG. 3B) CO (mass of 28) in the CO-TPR product stream. The $CO_2$ and CO baselines achieved by flowing the same reactant gas (10% CO/He) through an empty reactor tube at the same temperature conditions are also plotted. The positive $CO_2$ peaks and negative CO peaks compared to baseline indicate sample reduction by CO as reduction temperature ramps from ambient to as high as 900° C. Higher extent of sample reduction is represented by higher intensity of $CO_2$ signal and higher absolute value of the CO intensity.

In FIG. 3A-3B, highly resolved MS signals of $CO_2$ and CO recorded during CO-TPR measurements suggest the efficacy of the analysis approach. The onset reduction temperatures of the studied samples were around 150° C. to 250° C., and the reduction extends as temperature increases to 900° C. For each sample, the outstanding TPR peaks at different temperature ranges represent varied types of solid reductions. For the perovskites, the reduction mainly occurred with the B cations ($Co^{m+}$, $Fe^{n+}$, $Mn^{p+}$, and $Ru^{q+}$) since all the A cations ($Ca^{2+}$, $La^{3+}$ and $Sr^{2+}$) are non-reducible [3] at the described conditions. More specifically, the reduction happened with the surface oxygen-stabilized B site ions. An exception was with $CaCo_xZr_{1-x}O_{3-\delta}$ perovskite samples (PE-6 to 9), in which B site $Zr^{4+}$ ions were non-reducible at the described conditions, while the incorporation of $Zr^{4+}$ was simply for structural tuning reason as previously discussed.

Generally, the volumetric amounts of CO consumptions ($\nabla_{CO}$, mL/g sample) follow the trend of $CaCo_xZr_{1-x}O_{3-\delta}$ (x=0.9, 0.7, and 0.5)>$LaCo_{0.6}Ru_{0.4}O_{3-\delta}$>$CaCo_{0.3}Zr_{0.7}O_{3-\delta}$>$La_{0.6}Sr_{0.4}CoO_{3-\delta}$>$La_{0.5}Ca_{0.5}MnO_{3-\delta}$>$CeO_2$>CZO>$SrCo_{0.85}Fe_{0.15}O_{3-\delta}$>$Sr_{0.76}Ca_{0.24}FeO_{3-\delta}$. The reducibility of all the as-synthesized perovskite samples are higher than the commercial $CeO_2$ and CZO samples. Among the studied perovskites, $CaCo_xZr_{1-x}O_{3-\delta}$ exhibits good reducibility in CO-TPR. Specifically, $CaCo_{0.9}Zr0.1O_{3-\delta}$ shows significantly enhanced reducibility than the current state-of-the-art $La_{0.6}Sr_{0.4}CoO_{3-\delta}$.

FIG. 4 presents the $H_2$-TPR profiles of $CaCo_xZr_{1-x}O_3$ and $CaCo_{0.6-y}Zr_{0.4}Pd_yO_3$. The TPR profiles of $CaCo_xZr_{1-x}O_3$ (except for $CaZrO_3$) show two successive reduction peaks, with one in the range of 280-500° C., and the other in the range of 450-680° C. Consistent with previous studies, the two peaks can be respectively assigned to the reduction of $Co^{3+}$ to $Co^{2+}$, and $Co^{2+}$ to $Co^{0}$.[36,37] The amount of reducible sites increased with increasing Co contents. $CaZrO_3$ showed no reduction at all, which further proved that the reductions occurred solely on the Co sites. On the other hand, the reduction temperatures for both peaks shift to lower values with increasing Zr content. This result indicates that B-site substitution with Zr enhanced the reduction of Co species by lowering the reduction temperature.

The $H_2$-TPR profiles of fresh Pd-doped samples $CaCo_{0.6-y}Zr_{0.4}Pd_yO_{3-\delta}$ show obvious shifts of the high-temperature Co reduction peak ($Co^{3+}$ to $Co^{2+}$) to lower temperature (80-100° C. lower). Noticeable shifts to lower temperature of the $Co^{2+}$-to-$Co^0$ reduction peaks were also observed with Pd-doping. Moreover, the shifts were more significant with increasing Pd content. With the highest amount of Pd loading, three overlapping peaks are seen with $CaCo_{0.4}Zr_{0.4}Pd_{0.2}O_3$. The successive two reduction peaks at higher temperatures ($T_{max}$=390° C. and 420° C.) can be assigned to Co reductions as discussed, while the lower temperature ($T_{max}$=320° C.) peak corresponds to the reduction of oxide form of Pd ($Pd^{2+}$) into $Pd^0$.[36] The peak area reduces with decreasing Pd content. Consistent with previous reports, this suggests that Pd facilitated the Co reduction and improved the catalyst reducibility, which may be attributed to the hydrogen dissociation on surface $Pd^0$ particles followed by the successive spill-over of dissociated hydrogen atoms to the Co species.[38]

Both Pd-doped and un-doped perovskites showed higher reducibility than the $CeO_2$ and $CeO_2$—$ZrO_2$ (CZO) samples. For $CeO_2$, the main reduction happened at much higher temperature starting at 500° C., with $T_{max}$ at around 800° C., which is assigned to $Ce^{4+}$ to $Ce^{3+}$ reduction.[39] The incorporation of $Zr^{4+}$ in CZO structure enhanced the reducibility of Ce species, with the reduction peak shifting to lower temperature ($T_{max}$=520° C.). It is well established that in mixed ceria-zirconia a smaller ionic radius of zirconium favors the presence of $Ce^{3+}$ ions by eliminating the strain associated with their formation, while the enhanced oxygen defects account for the improved reducibility/OSC.[40]

3.4. Dynamic CO and Oxygen Storage Capacities for the Studied Materials

The CO and oxygen storage capacities of the studied materials were measured by dynamic isothermal redox cyclic tests, where CO and $O_2$ were respectively used as the reducing and oxidizing agents. During the measurement, constant flows of 20% CO/He and air were purged for transient periods (30 seconds) in sequence through the degassed sample, and He was purged (for 15 min) in between the reduction and oxidation steps to purge out the residual gas. The performance of each sample was studied isothermally at four redox temperatures (500, 600, 700, and 800° C.), while three repetitive measurements were performed in succession at each temperature. The gas product composition downstream were closely monitored by TCD and MS. FIG. 5A-5B and FIG. 6 illustrate the MS responses (in terms of mass fraction partial pressure) of product $CO_2$ (solid line peaks*) and unreacted $O_2$ (dotted line peaks*) during the measurements for all the studied materials. Specifically, FIG. 5A-5B compares the material performances among different types of perovskites (PE-1 to 6) and the commercial OSMs ($CeO_2$ and CZO), while FIG. 6 presents the OSCs of $CaCo_xZr_{1-x}O_{3-\delta}$ perovskites (PE-6 to 9) with varying x values. Appreciable $CO_2$ formations (CO conversions) were detected at the studied temperatures for all studied materials during reduction. Generally, the redox properties increase with increasing temperature from 500° C. to 800° C. In addition, the isothermal process showed relatively steady responses for the CO conversion in the reduction steps and the $O_2$ storage in the subsequent oxidation steps, suggesting stable material performance.

In FIG. 6, the material redox properties improved with increasing temperature from 500° C. to 800° C., and with increasing x values (higher Co content). At lower temperatures (500° C. and 600° C.), repeatable redox behaviours were shown with all studied materials, indicating stable OSC performance. As redox temperature was elevated (800° C.), $CaCo_xZr_{1-x}O_{3-\delta}$ (when x>0.5) showed profound CO consumption during reduction, but continuously decreasing $O_2$ consumption during oxidation with cycles. This was likely due to the instability of Co (CoO phase was released from the main phase through decomposition) at high temperature reducing atmosphere.[41] When higher amount of Zr was present in the perovskites (x≤0.5), the oxygen storage was repeatable even at higher temperatures. This is consistent with the previously stated hypothesis that stabilized $CaCo_xZr_{1-x}O_{3-\delta}$ perovskite structures can be achieved by partial substitution of B-site Co with certain amount of Zr (x≤0.5). When x=0.5, the optimum perovskite composition $CaCo_{0.5}Zr_{0.5}O_{3-\delta}$ exhibited optimum oxygen storage capacity and stability.

3.5. Reaction Kinetic Study of Oxygen-Intake of $CaCo_{0.5}Zr_{0.5}O_{3-\delta}$ The oxygen intake kinetics of reduced $CaCo_{0.5}Zr_{0.5}O_{3-\delta}$ perovskite were further studied. FIG. 7A-7C shows plots used for kinetic calculation based on isothermal TG data between 350 and 475° C., and under 5% $O_2$/He. Prior to measurement at each temperature, the sample was completely degassed at 500° C. and pre-reduced by 10% CO/He at the same temperature. The data are analysed based on the solid-state kinetic study methodology summarized by Hancock and Sharp,[42] and recent related discussions by Motohashi, et al.[43] The time-dependent fraction of the solid reacted (α) and its variation (ln[−ln(1−α)]) are plotted as a function of time on stream (t), reduced time $t/t_{0.5}$, or time in log scale (ln t). The fraction reacted (α) is calculated using Eq. (4), where $m_0$, $m_t$, and $m_{final}$ are respectively the sample weight at the beginning, time on stream of t (in min), and the end of TG measurement during sample oxidation. A scale of 0-1 is allowed for the α value, with α=0 and α=1 respectively indicating the onset and the equilibrium states of the solid reaction.

$$\alpha = \frac{m_0 - m_t}{m_0 - m_{final}} \quad (4)$$

Generally, sample oxidation rate accelerates with increasing temperature from 350° C. to 475° C. (FIG. 7A), and decreases with increasing time on stream by showing a smaller slope as $t/t_{0.5}$ value increases for each curve (FIG. 7B). The reaction mechanisms can be examined by plotting ln[−ln(1−α)] as a function of ln t (with t in min) when a linear rate-rated equation with slope m is acquired (FIG. 7C). The m values of all the linear curves fall in the range of 0.6~1.3 (m=1.29, 1.23, 1.31, 1.09, 0.88, 0.61 respectively at 350, 375, 400, 425, 450 and 475° C.).

The data points at 350° C.≤T≤475° C. nicely obey rate equation Eq. (5), indicating first-order kinetics for both samples at the studied oxidation reaction conditions. Following Arrhenius equation, the reaction rate constants (k) in log scale upon oxygen intakes were then plotted against inverse temperature (1000/T), as shown as FIG. 8. The reaction activation energy ($E_a$, in eV) values for the oxygen intake process was calculated to be 0.159 eV for $CaCo_{0.5}Zr_{0.5}O_{3-\delta}$ perovskite.

$$-ln(1+\alpha)=kt \quad (5)$$

3.6. Catalytic CO and HC Oxidation Activities of Pd-Doped $CaCo_xZr_{1-x}O_{3-\delta}$ Catalytic activities for CO and HC oxidation at simulated exhaust feed with Pd-doped $CaCo_{0.6-y}Zr_{0.4}Pd_yO_{3-\delta}$ (y=0, 0.05 and 0.1) perovskite samples were investigated. $C_3H_6$ was used as the model compound for HC. FIG. 9 presents the catalytic oxidation activity of fresh (a) $CaCo_{0.5}Zr_{0.4}Pd_{0.1}O_{3-\delta}$, (b) $CaCo_{0.55}Zr_{0.4}Pd_{0.05}O_{3-\delta}$ and (c) $CaCo_{0.5}Zr_{0.5}O_{3-\delta}$, with corresponding dopant Pd contents (wt-%) of 5.0%, 2.5% and 0%. The oxidation activities were profiled as CO and $C_3H_8$ conversions vs. reaction temperature from 150-550° C., every 25° C. The conversion profiles were collected at three different stoichiometric numbers (SNs) at 0.95, 1.07 and 1.16, respectively simulating slight fuel rich, stoichiometric, and fuel lean conditions. As can be seen, all the perovskite-type OSMs exhibit excellent activities for CO and HC ($C_3H_6$) oxidation. Complete conversions of CO and HC were observed below 350° C. in all the Pd doped OSMs. The $T_{50}$ for $C_3H_6$ oxidation was as low as 250° C., while for CO oxidation was as low as 240° C. The HC oxidation activities of all the Pd doped $CaCo_xZr_{1-x}O_{3-\delta}$-TWCs were comparable to, if not higher than, state-of-the-art TWCs. These promising data clearly confirm the excellent potential for the proposed perovskite TWCs.

Generally, Pd-doped $CaCo_xZr_{1-x}O_{3-\delta}$ samples showed higher catalytic oxidation activities than Pd-free one at all three conditions, especially at higher SN (fuel lean) conditions. It is obvious that the presence of Pd promotes the surface chemisorption and dissociation/activation of CO and $C_3H_8$ molecules. The oxidation activity were comparable with $CaCo_{0.5}Zr_{0.4}Pd_{0.1}O_{3-\delta}$ and $CaCo_{0.55}Zr_{0.4}Pd_{0.05}O_{3-\delta}$, suggesting mass transfer-limitation with the later sample at the studied conditions. For the same Pd-containing sample, higher conversions were shown at richer condition (SN=0.95), which were most likely because of more accessible active sites generated from "Pd segregation to the surface" at reducing conditions.[27,29,36] The Pd-free $CaCo_xZr_{1-x}O_{3-\delta}$ also showed CO and $C_3H_8$ conversions, and significantly enhanced conversions when less $O_2$ was present in the feed (at lean condition). When Pd was absent, surface chemisorption became the rate-limiting step and CO and $C_3H_8$ from the atmosphere were likely directly oxidized by the surface oxygens newly generated or transferred from the lattice. It is also interesting that at fuel rich (SN=0.95), all samples showed reduced CO conversions and increased $H_2$ productions at temperature above 400° C., suggesting the occurrence of steam reforming reaction (excess $C_3H_8$ react with $H_2O$ product from oxidation reaction, to produce $H_2$ and CO) thermodynamically preferable (endothermic reaction) at higher temperatures. This could be avoided by operating engine mode at stoichiometric conditions.

4. Conclusions

In this disclosure, $CaCo_xZr_{1-x}O_{3-\delta}$ (x=0, 0.3, 0.5, 0.7 and 0.9) perovskites were synthesized for the first time and reported to show improved redox property and oxygen storage capacity (OSC) compared to the state-of-the-art perovskites and ceria-based oxygen storage materials (OSMs). Pd-doped $CaCo_{0.6-y}Zr_{0.4}Pd_yO_3$ (y=0.05, 0.1 and 0.2) samples showed promising catalytic activity towards $C_3H_6$ and CO oxidation under simulated exhaust conditions, suggesting their potential application in three-way catalysis for automotive emissions control.

The studied perovskites retain their main phase of orthorhombic Lakargiite $CaZrO_3$ structure. Partial substitution of Co by Zr at B sites enhances the perovskite structural crystallinity, but ZrO phase impurity increased with increasing Zr content. For Pd-containing samples, Pd was present as both forms of bulk $Pd^{2+}$ and surface $Pd^0$, and the amount of surface $Pd^0$ increased with increasing Pd content. When x was around 0.5, perovskites exhibit optimum crystallinity and minimized impurity.

The redox and OSC properties were mainly attributed to B-site Co and Pd. The amount of reducible sites increased with increasing Co contents, while partial substitution with Zr enhanced the reduction of Co species by lowering the reduction temperature. Pd dopant also facilitated the Co reduction and improved the catalyst reducibility. Perovskite-type OSM with composition of $CaCo_{0.5}Zr_{0.5}O_3$ with or without Pd doping gives the optimized reducibility and structural stability. Further kinetics study showed a first order reaction mechanism with an activation energy ($E_a$) of 0.159 eV for $CaCo_{0.5}Zr_{0.5}O_{3-\delta}$.

Fresh $CaCo_{0.5}Zr_{0.4}Pd_{0.1}O_{3-\delta}$, $CaCo_{0.55}Zr_{0.4}Pd_{0.05}O_{3-\delta}$ and $CaCo_{0.5}Zr_{0.5}O_{3-\delta}$ samples all showed profound conversions of $C_3H_6$ and CO through catalytic oxidation at fuel lean-rich conditions (SN=1.16, 1.07 and 0.95), with lowest $T_{50}$s for $C_3H_6$ and CO conversions <250° C. Pd-doped perovskites showed higher oxidation activities than Pd-free one at all three conditions, especially at higher SN (lean) conditions. For the same Pd-containing sample, higher conversions were shown at richer condition (SN=0.95), which can be attributed to the reported phenomena of "Pd segregation to the surface".

7. REFERENCES (1) Royer, S.; Alamdari, H.; Duprez, D.; Kaliaguine, S. *Appl. Catal. B Environ.* 2005, 58 (3-4), 273-288.

(2) Klimkowicz, A.; Świerczek, K.; Takasaki, A.; Dabrowski, B. *Solid State Ion.* 2014, 257, 23-28.

(3) Hernández, W. Y.; Tsampas, M. N.; Zhao, C.; Boreave, A.; Bosselet, F.; Vernoux, P. *Catal. Today* 2015, 258, Part2, 525-534.

(4) Mizusaki, J.; Tagawa, H.; Naraya, K.; Sasamoto, T. *Solid State Ion.* 1991, 49, 111-118.

(5) Albrecht, K. J.; Jackson, G. S.; Braun, R. J. *Appl. Energy* 2016, 165, 285-296.

(6) Gálvez, M. E.; Jacot, R.; Scheffe, J.; Cooper, T.; Patzke, G.; Steinfeld, A. *Phys. Chem. Chem. Phys.* 2015,17 (9), 6629-6634.

(7) Babiniec, S. M.; Coker, E. N.; Miller, J. E.; Ambrosini, A. *Sol. Energy* 2015, 118, 451-459.

(8) McDaniel, A. H.; Ambrosini, A.; Coker, E. N.; Miller, J. E.; Chueh, W. C.; O'Hayre, R.; Tong, J. *Energy Procedia* 2014, 49, 2009-2018.

(9) Demont, A.; Abanades, S. *RSC Adv.* 2014, 4 (97), 54885-54891.

(10) Zheng, Q.; Farrauto, R.; Deeba, M. *Catalysts* 2015, 5 (4), 1797-1814.

(11) Zheng, Q.; Farrauto, R.; Deeba, M.; Valsamakis, I. *Catalysts* 2015, 5 (4), 1770-1796.

(12) Simson, A.; Roark, K.; Farrauto, R. *Appl. Catal. B Environ.* 2014, 158-159, 106-111.

(13) Ran, R.; Wu, X.; Weng, D.; Fan, J. *J. Alloys Compd.* 2013, 577, 288-294.

(14) Keav, S.; Matam, S. K.; Ferri, D.; Weidenkaff, A. *Catalysts* 2014, 4 (3), 226-255.

(15) Levasseur, B.; Kaliaguine, S. *Appl. Catal. B Environ.* 2009, 88 (3-4), 305-314.

(16) Guilhaume, N.; Primet, M. *J. Catal.* 1997, 165 (2), 197-204.

(17) Uenishi, M.; Tanaka, H.; Taniguchi, M.; Tan, I.; Sakamoto, Y.; Matsunaga, S.; Yokota, K.; Kobayashi, T. *Appl. Catal. Gen.* 2005, 296 (1), 114-119.

(18) Tanaka, H.; Taniguchi, M.; Uenishi, M.; Kajita, N.; Tan, I.; Nishihata, Y.; Mizuki, J. 'ichiro; Narita, K.; Kimura, M.; Kaneko, K. *Angew. Chem. Int. Ed.* 2006, 45 (36), 5998-6002.

(19) You, R.; Zhang, Y.; Liu, D.; Meng, M.; Zheng, L.; Zhang, J.; Hu, T. *J. Phys. Chem. C* 2014, 118 (44), 25403-25420.

(20) Nishihata, Y.; Mizuki, J.; Akao, T.; Tanaka, H.; Uenishi, M.; Kimura, M.; Okamoto, T.; Hamada, N. *Nature* 2002, 418 (6894), 164-167.

(21) Glisenti, A.; Pacella, M.; Guiotto, M.; Natile, M. M.; Canu, P. *Appl. Catal. B Environ.* 2016, 180, 94-105.

(22) Li, Z.; Meng, M.; Zha, Y.; Dai, F.; Hu, T.; Xie, Y.; Zhang, J. *Appl. Catal. B Environ.* 2012, 121-122, 65-74.

(23) Shen, S.-T.; Weng, H.-S. *Ind. Eng. Chem. Res.* 1998, 37 (7), 2654-2661.

(24) Tanaka, H.; Mizuno, N.; Misono, M. *Appl. Catal. Gen.* 2003, 244 (2), 371-382.

(25) Tanaka, H.; Misono, M. *Curr. Opin. Solid State Mater. Sci.* 2001, 5 (5), 381-387.

(26) Tanaka, H.; Tan, I.; Uenishi, M.; Kimura, M.; Dohmae, K. *Top. Catal.* 2001, 16-17 (1-4), 63-70.

(27) Li, X.; Chen, C.; Liu, C.; Xian, H.; Guo, L.; Lv, J.; Jiang, Z.; Vernoux, P. *ACS Catal.* 2013, 3 (6), 1071-1075.

(28) Yoon, D. Y.; Kim, Y. J.; Lim, J. H.; Cho, B. K.; Hong, S. B.; Nam, I.-S.; Choung, J. W. *J. Catal.* 2015, 330, 71-83.

(29) Malamis, S. A.; Harrington, R. J.; Katz, M. B.; Koerschner, D. S.; Zhang, S.; Cheng, Y.; Xu, L.; Jen, H.-W.; McCabe, R. W.; Graham, G. W.; Pan, X. *Catal. Today* 2015, 258, Part2, 535-542.

(30) H. Bork, A.; Kubicek, M.; Struzik, M.; M. Rupp, J. L. *J. Mater. Chem. A* 2015, 3 (30), 15546-15557.

(31) Miura, N.; Ikeda, H.; Tsuchida, A. *Ind. Eng. Chem. Res.* 2016, 55 (11), 3091-3096.

(32) Mota, N.; Barrio, L.; Alvarez-Galván, C.; Fauth, F.; Navarro, R. M.; Fierro, J. L. G. *J. Phys. Chem. C* 2015, 119 (29), 16708-16723.

(33) Ikeda, H.; Tsuchida, A.; Morita, J.; Miura, N. *Ind. Eng. Chem. Res.* 2016, 55 (22), 6501-6505.

(34) Dey, S.; Naidu, B. S.; Govindaraj, A.; Rao, C. N. R. *Phys. Chem. Chem. Phys.* 2014, 17 (1), 122-125.

(35) Pecchi, G.; Reyes, P.; Zamora, R.; Campos, C.; Cadús, L. E.; Barbero, B. P. *Catal. Today* 2008, 133-135, 420-427.

(36) Sartipi, S.; Khodadadi, A. A.; Mortazavi, Y. *Appl. Catal. B Environ.* 2008, 83 (3-4), 214-220.

(37) Escalona, N.; Fuentealba, S.; Pecchi, G. *Appl. Catal. Gen.* 2010, 381 (1-2), 253-260.

(38) Shen, W.-J.; Okumura, M.; Matsumura, Y.; Haruta, M. *Appl. Catal. Gen.* 2001, 213 (2), 225-232.

(39) Song, H.; Ozkan, U. S. *J. Phys. Chem. A* 2010, 114 (11), 3796-3801.

(40) Mamontov, E.; Egami, T.; Brezny, R.; Koranne, M.; Tyagi, S. *J. Phys. Chem. B* 2000, 104 (47), 11110-11116.

(41) Hu, L.; Zhou, C.; Wu, C.; Zhou, S.; Wang, W. G.; Yin, H. *Eur. J. Inorg. Chem.* 2015, 2015 (13), 2317-2322.

(42) Hancock, J. D.; Sharp, J. H. *J. Am. Ceram. Soc.* 1972, 55 (2), 74-77.

(43) Motohashi, T.; Ueda, T.; Masubuchi, Y.; Kikkawa, S. *J. Phys. Chem. C* 2013, 117 (24), 12560-12566.

It should be understood that the description above is only representative of illustrative embodiments and examples. For the convenience of the reader, the above description has focused on a limited number of representative examples of all possible embodiments, examples that teach the principles of the disclosure. The description has not attempted to exhaustively enumerate all possible variations or even combinations of those variations described. That alternate embodiments may not have been presented for a specific portion of the disclosure, or that further undescribed alternate embodiments may be available for a portion, is not to be considered a disclaimer of those alternate embodiments. One of ordinary skill will appreciate that many of those undescribed embodiments, involve differences in technology and materials rather than differences in the application of the principles of the disclosure. Accordingly, the disclosure is not intended to be limited to less than the scope set forth in the following claims and equivalents.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world. It is to be understood that, while the disclosure has been described in conjunction with the detailed description, thereof, the foregoing description is intended to illustrate and not limit the scope. Other aspects, advantages, and modifications are within the scope of the claims set forth below. All publications, patents, and patent applications cited in this specification are herein incorporated by reference as if each individual publication or patent application were specifically and individually indicated to be incorporated by reference.

What is claimed is:

1. A catalyst comprising a platinum-group metal and a perovskite having the formula $(La_{1-y}Ca_y)_{1-x}Mn_xO_{3-\delta}$, $La_{1-x}(Co_{1-y}Ru_y)_xO_{3-\delta}$, $(La_{1-y}Sr_y)_{1-31\ x}Co_xO_{3-\delta}$, $Sr_{1-x}(Co_{1-y}Fe_y)_xO_{3-\delta}$, $(Sr_{1-y}Ca_y)_{1-x}Fe_xO_{3-\delta}$; x is a number defined by $0.02 \leq x \leq 0.98$; y is a number defined by $0.02 \leq y \leq 0.98$; and $\delta$ is a number defined by $0.0 \leq \delta \leq 1.0$.

2. The catalyst of claim 1, wherein y is a number defined by $0.15 \leq y \leq 0.85$.

3. The catalyst of claim 1, wherein x is a number defined by $0.3 \leq x \leq 0.7$.

4. The catalyst of claim 1, wherein the platinum-group metal is Pd, Pt, Rh, Ru, or a mixture thereof.

5. The catalyst of claim 4, wherein the platinum-group metal is a mixture of Pd and Rh.

6. The catalyst of claim 1, wherein the catalyst is on an $Al_2O_3$ support, a titania support, a zirconia support, a ceria support, a silica support, an alumina-silica support, a zeolite support, or a carbon support.

7. The catalyst of claim 1, wherein the catalyst is formed into a monolith honeycomb block.

8. The catalyst of claim 1, wherein the catalyst is coated on to a ceramic monolith honeycomb block.

9. The catalyst of claim 8, wherein the ceramic monolith honeycomb block is a cordierite compound.

10. The catalyst of claim 1, wherein the catalyst is a three-way catalyst.

11. The catalyst of claim 1, wherein the catalyst is used to catalyze the reduction of $NO_x$ or the oxidation of CO or hydrocarbons from an internal combustion engine.

12. The catalyst of claim 11, wherein the internal combustion engine is an automobile engine.

13. A method for reducing emissions from an internal combustion engine which comprises contacting an exhaust stream from the internal combustion engine with a catalyst comprising a platinum-group metal and a perovskite having the formula $(La_{1-y}Ca_y)_{1-x}Mn_xO_{3-\delta}$, $La_{1-x}(Co_{1-y}Ru_y)_xO_{3-\delta}$, $(La_{1-y}Sr_y)_{1-x}Co_xO_{3-\delta}$, $Sr_{1-x}(Co_{1-y}Fe_y)_xO_{3-\delta}$, $(Sr_{1-y}Ca_y)_{1-x}Fe_xO_{3-\delta}$; x is a number defined by $0.02 \leq x \leq 0.98$; y is a number defined by $0.02 \leq y \leq 0.98$; and $\delta$ is a number defined by $0.0 \leq \delta \leq 1.0$.

14. An exhaust system for reducing emissions from an internal combustion engine which comprises a catalyst comprising a platinum-group metal and a perovskite having the formula $(La_{1-y}Ca_y)_{1-x}Mn_xO_{3-\delta}$, $La_{1-x}(Co_{1-y}Ru_y)_xO_{3-\delta}$, $(La_{1-y}Sr_y)_{1-x}Co_xO_{3-\delta}$, $Sr_{1-x}(Co_{1-y}Fe_y)_xO_{3-\delta}$, $(Sr_{1-y}Ca_y)_{1-x}Fe_xO_{3-\delta}$; x is a number defined by $0.02 \leq x \leq 0.98$; y is a number defined by $0.02 \leq y \leq 0.98$; and $\delta$ is a number defined by $0.0 \leq \delta \leq 1.0$ and a solid support.

* * * * *